United States Patent
Matsui et al.

(10) Patent No.: US 10,812,193 B2
(45) Date of Patent: Oct. 20, 2020

(54) OPTICAL TRANSCEIVER

(71) Applicant: SUMITOMO ELECTRIC INDUSTRIES, LTD., Osaka-shi (JP)

(72) Inventors: Takashi Matsui, Osaka (JP); Hiromi Kurashima, Osaka (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

(21) Appl. No.: 16/714,343

(22) Filed: Dec. 13, 2019

(65) Prior Publication Data
US 2020/0195350 A1  Jun. 18, 2020

(30) Foreign Application Priority Data

Dec. 17, 2018 (JP) .................................. 2018-235791

(51) Int. Cl.
*H04B 10/40* (2013.01)
*G02B 6/42* (2006.01)

(52) U.S. Cl.
CPC .......... *H04B 10/40* (2013.01); *G02B 6/4246* (2013.01); *G02B 6/4281* (2013.01)

(58) Field of Classification Search
None
See application file for complete search history.

(56) References Cited

U.S. PATENT DOCUMENTS

| | | | | |
|---|---|---|---|---|
| 2007/0237462 A1* | 10/2007 | Aronson | ............. | G02B 6/4416 385/89 |
| 2007/0237471 A1* | 10/2007 | Aronson | ............. | G02B 6/4284 385/101 |
| 2011/0103797 A1* | 5/2011 | Oki | ............. | G02B 6/4243 398/79 |
| 2011/0225792 A1* | 9/2011 | Oki | ............. | G02B 6/4201 29/428 |
| 2011/0229095 A1* | 9/2011 | Oki | ............. | G02B 6/4256 385/92 |
| 2011/0229096 A1* | 9/2011 | Oki | ............. | G02B 6/4261 385/92 |
| 2011/0255831 A1* | 10/2011 | Oki | ............. | G02B 6/4292 385/78 |
| 2011/0262078 A1* | 10/2011 | Oki | ............. | G02B 6/4243 385/78 |

FOREIGN PATENT DOCUMENTS

| | | |
|---|---|---|
| JP | 2009-510836 A | 3/2009 |
| JP | 2014-149498 A | 8/2014 |
| WO | 2007/038026 A1 | 4/2007 |

* cited by examiner

*Primary Examiner* — David W Lambert
(74) *Attorney, Agent, or Firm* — Baker Botts L.L.P.; Michael A. Sartori

(57) ABSTRACT

An optical transceiver comprises an optical port, paired transmitter optical sub-assemblies (TOSAs), paired receiver optical sub-assemblies (ROSAs) and a printed circuit board (PCB) including an electrical circuit electrically connected to the paired TOSAs and the paired ROSAs. And the optical transceiver comprises a housing configured to house the optical port, the paired ROSAs, the paired TOSAs, and the PCB, so that the paired ROSAs are arranged between the optical port and the PCB in the first direction and the paired TOSAs are arranged between the paired ROSAs and the PCB in the first direction.

5 Claims, 27 Drawing Sheets

OPTICAL TRANSCEIVER

TECHNICAL FIELD

An aspect of the present disclosure relates to an optical transceiver.

BACKGROUND

Japanese Unexamined Patent Publication No. 2009-510836 describes an optical transceiver module. The optical transceiver module includes one receiver optical sub-assembly (ROSA), one transmitter optical sub-assembly (TOSA), a printed circuit board (PCB) mounted with a circuit that processes electric signals handled by the ROSA and the TOSA, and lead frame connectors that connect the ROSA and the TOSA to the PCB. From the rear end part of the ROSA, a plurality of leads protrudes. The lead frame connector connected to the ROSA has a plurality of holes. The plurality of leads penetrates the plurality of holes. The lead frame connector is joined to the ROSA with the plurality of leads of the ROSA individually penetrating the plurality of holes. Similarly to joining the lead frame connector to the ROSA, the lead frame connector and the TOSA are joined to each other.

Japanese Unexamined Patent Publication No. 2014-149498 describes an optical module. The optical module includes one TOSA, one ROSA, and a printed circuit board to which the TOSA and the ROSA are connected. On the printed circuit board, an electronic circuit is formed, and the TOSA and the ROSA are electrically connected to the electronic circuit. The TOSA and the ROSA are connected to the printed circuit board by soldering FPCs.

SUMMARY

An optical transceiver according to one aspect of the present disclosure is an optical transceiver insertable to an apparatus in a first direction. The optical transceiver comprises an optical port including first paired ports and second paired ports, the first paired ports and the second paired ports being arranged in line in a second direction perpendicular to the first direction. The optical transceiver comprises paired transmitter optical sub-assemblies (TOSAs) each performing an electrical-to-optical signal conversion, one of the paired TOSAs being optically connected to one of the first paired ports through a first fiber, another of the paired TOSAs being optically connected to one of the second paired ports through a second fiber, the paired TOSAs being arranged to each other in line in the second direction. The optical transceiver comprises paired receiver optical sub-assemblies (ROSAs) each performing an optical-to-electrical signal conversion, one of the paired ROSAs being optically connected to another of the first paired ports through a third fiber, another of the paired ROSAs being optically connected to another of the second paired ports through a fourth fiber, the paired ROSAs being arranged to each other in line in the second direction. The optical transceiver comprises a printed circuit board (PCB) including an electrical circuit electrically connected to the paired TOSAs and the paired ROSAs. And the optical transceiver comprises a housing configured to house the optical port, the paired ROSAs, the paired TOSAs, and the PCB, so that the paired ROSAs are arranged between the optical port and the PCB in the first direction and the paired TOSAs are arranged between the paired ROSAs and the PCB in the first direction.

DETAILED DESCRIPTION

Detail of Embodiment

Figure 1:
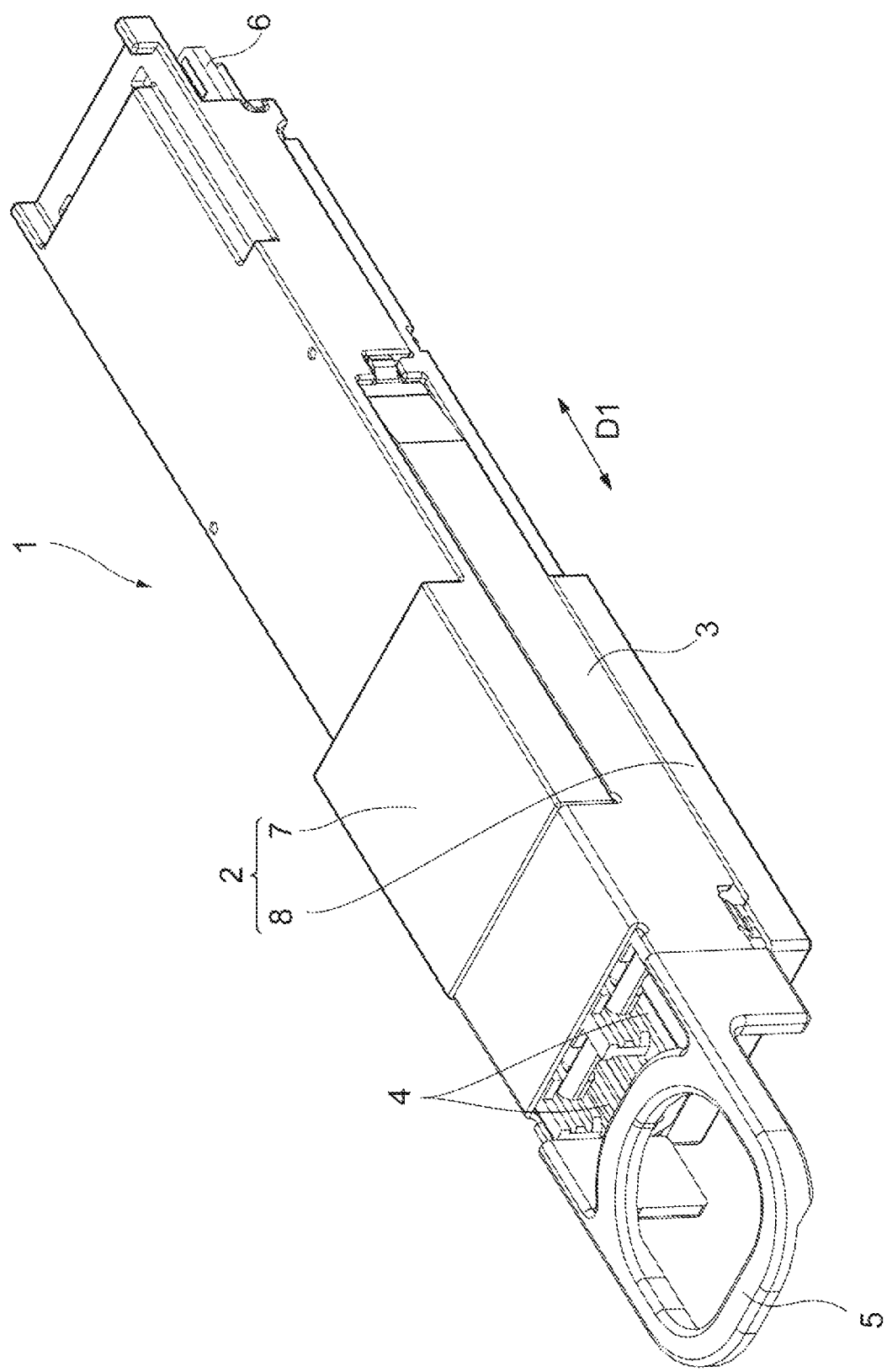
FIG. 1 is a perspective view showing an optical transceiver according to an embodiment of the present disclosure.

In the following, a specific example of an optical transceiver according to an embodiment will be described with reference to the drawings. Note that the present invention is not limited to examples below, and is intended to include all modifications shown by claims and within the scope equivalent to claims. In the following description, in the description of the drawings, the same or corresponding elements are designated with the same reference signs, and the duplicate description is appropriately omitted. For convenience of understanding, a part of the drawings is sometimes simplified or exaggerated, and dimensions, ratios, and the like are not limited to ones described in the drawings.

Figure 2:
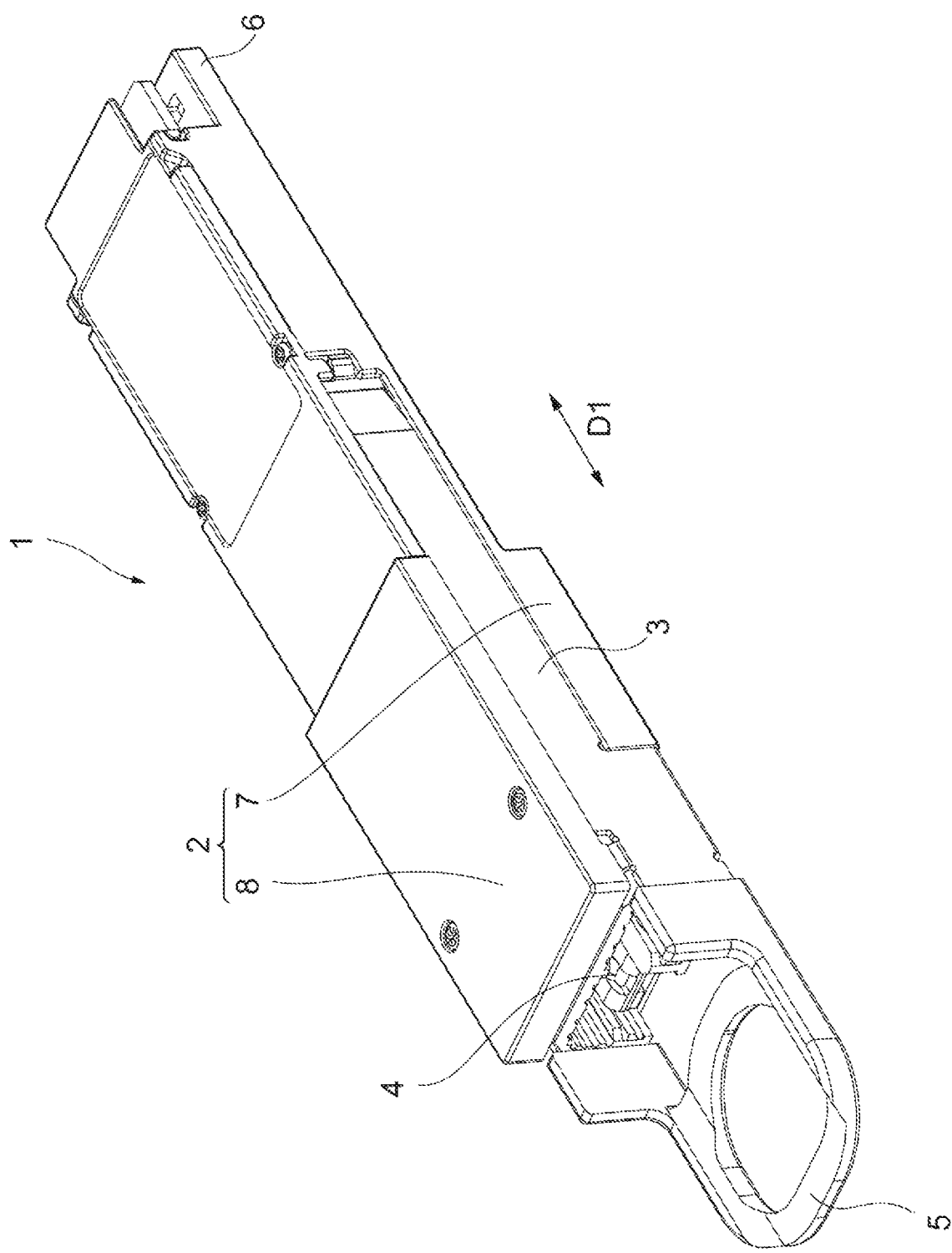
FIG. 2 is a perspective view of the optical transceiver in FIG. 1 viewed from a direction different from the direction in FIG. 1.

FIG. 1 is a perspective view showing an optical transceiver 1 according to an embodiment. FIG. 2 is a perspective view of the optical transceiver 1 viewed from a direction different from FIG. 1. The optical transceiver 1 is in compliance with the quad small form-factor pluggable (QSFP) standards, for example. The standards referred here are the multi-source agreement (MSA) that is one of industry standards, for example. As shown in FIGS. 1 and 2, the optical transceiver 1 includes a metal housing 2, a slider 3 that engages with the housing 2, an optical receptacle 4 located at one end of the housing 2, and a pull-tab 5 extending from the slider 3.

The housing 2 shows the shape of a rectangular cuboid, and extends long in one direction D1 that is the longitudinal direction of the optical transceiver 1. The optical transceiver 1 is plugged into (inserted into and extracted from) a cage provided on a host system (a communication apparatus) along the one direction D1. The cage (not shown) shows the shape of a rectangular cuboid similarly to the housing 2, and extends long in the one direction D1. The inner side of the cage is a hollow, and the optical transceiver 1 can be housed in the hollow. The cage has an opening toward the outside of the communication apparatus. The optical transceiver 1 is inserted into the inside of the cage through the opening. The part housed in the cage is mainly the part of the housing 2, and the optical receptacle 4 and the pull-tab 5 are exposed to the outside of the cage. That is, when the optical transceiver 1 is inserted into the cage, the optical transceiver 1 is moved such that one end where the optical receptacle 4 is provided along the one direction D1 that is the longitudinal direction of the housing 2 and the other end located on the opposite side of the one end come close to the cage (the other end is housed in the inside of the cage). When the optical transceiver 1 is extracted (pulled out) from the cage, the optical transceiver 1 is moved such that the one end of the housing 2 where the optical receptacle 4 is provided is away from the cage.

The slider 3 extends from the one end of the housing 2 where the optical receptacle 4 is provided along the one direction D1. The optical receptacle 4 accepts an external optical connector, and externally transmits and receives optical signals through the optical connector. The optical connector is a CS connector, for example. The CS connector includes two ferrules in one CS connector. The two ferrules are provided at the tip ends of optical fibers different from each other. For example, the one ferrule and an optical fiber including the ferrule at the tip end are used for transmission of optical signals, and the other ferrule and an optical fiber including the ferrule at the tip end are used for reception of optical signals, and hence two-optical fiber two-way communication can be performed through one CS connector. As described later, the optical receptacle 4 can accept two CS connectors. The housing 2 includes an electric plug 6 connected to an electric connector provided in the inside of the cage at the other end located on the opposite side of one end where the optical receptacle 4 is provided. That is, in inserting the optical transceiver 1 into the cage, when the electric plug 6 is inserted into the opening of the cage and fit into the electric connector provided on the back of the cage, the optical transceiver 1 does not go further (does not go to the back). After the electric plug 6 is fit into the electric connector, the optical transceiver 1 is electrically connected to the host system. For example, the electric plug 6 and the electric connector each include a power supply terminal and a ground terminal. The electric plug 6 and the electric connector are electrically connected to each other, and the optical transceiver 1 is supplied with electric power necessary to operation from the host system. The optical transceiver 1 receives electric signals that are converted into optical signals for transmission from the host system through the electric plug 6 and the electric connector, and sends electric signals converted from the received optical signal to the host system. The optical transceiver 1 communicates with the host system electric signals for monitoring and control as well. The electric plug 6 is fit into the electric connector with a power supply voltage or an electric signal applied to the electric connector, and can be pulled out from the electric connector. That is, the optical transceiver 1 is hot pluggable. The optical transceiver 1 is supplied with electric power by being hot-inserted into the host system, and starts activation. The pull-tab 5 is made of a resin, for example, and formed of a material of flexibility. By pulling the pull-tab 5 to the opposite side of the cage with the pull-tab 5 held, the engagement of the optical transceiver 1 with the cage is released, and the optical transceiver 1 can be pulled out from the host system.

The housing 2 shows a rectangular cuboid shape. For example, the cross sectional form of the housing 2 is in a rectangle when the housing 2 is cut on the plane extending perpendicularly in the one direction D1. The housing 2 includes an upper housing 7 and a lower housing 8, and the slider 3 is provided between the upper housing 7 and the lower housing 8. The upper housing 7 and the lower housing 8 are joined to each other with a plurality of screws with a gasket is interposed, for example. Note that in the following description, "front-to-rear" and "up-to-down" directions are sometimes used. However, these directions are provided for convenience based on the states shown in the drawings, and do not limit directions. In the following description, the optical receptacle 4 side may be referred to as "the front", the electric plug 6 side as "the rear", the direction of viewing the upper housing 7 from the lower housing 8 as "the upper side", and the direction of viewing the lower housing 8 from the upper housing 7 as "the lower side", and the "up-to-down" direction" as "the height".

Figure 3:
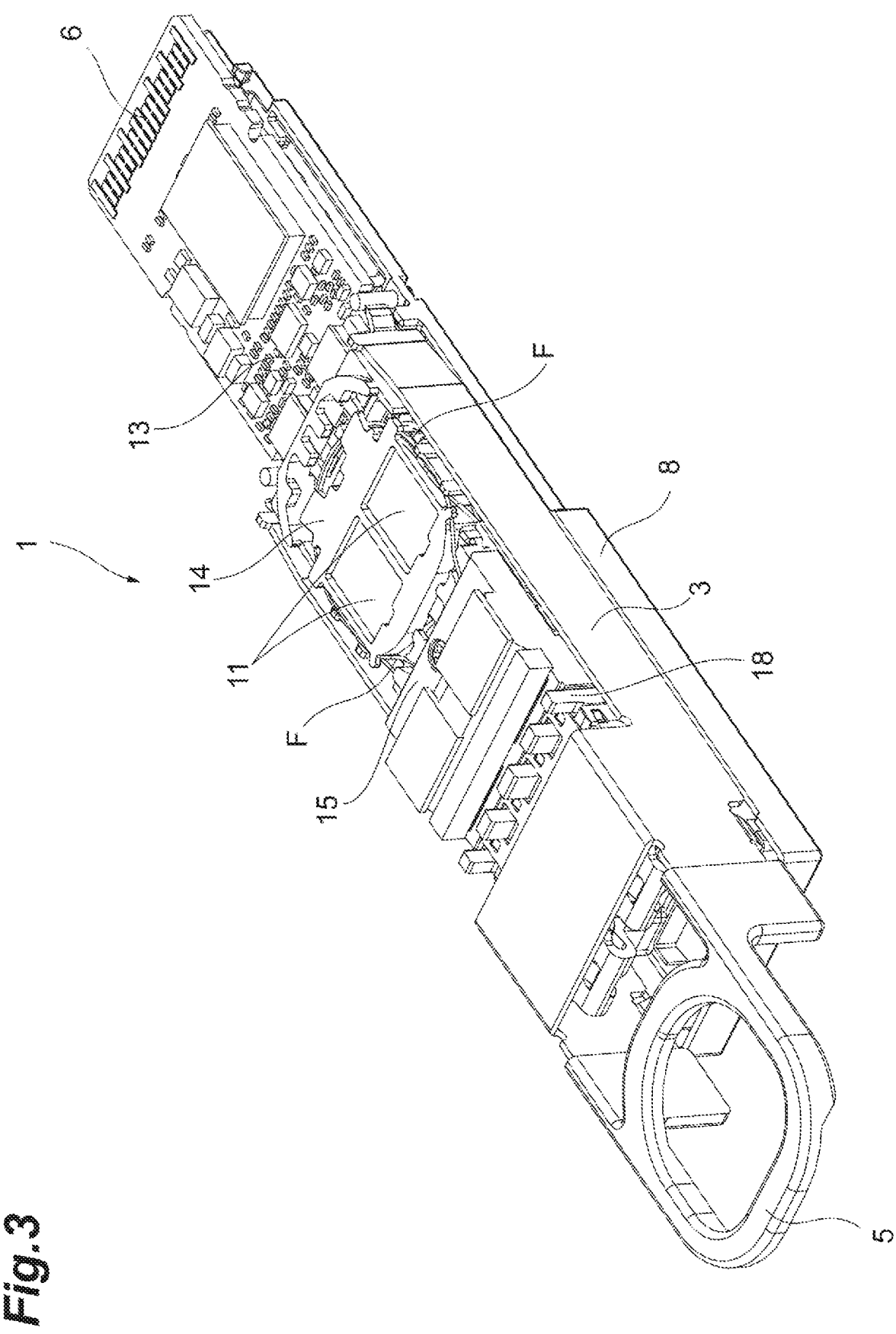
FIG. 3 is a perspective view showing the internal structure of the optical transceiver in FIG. 1.
Figure 4:
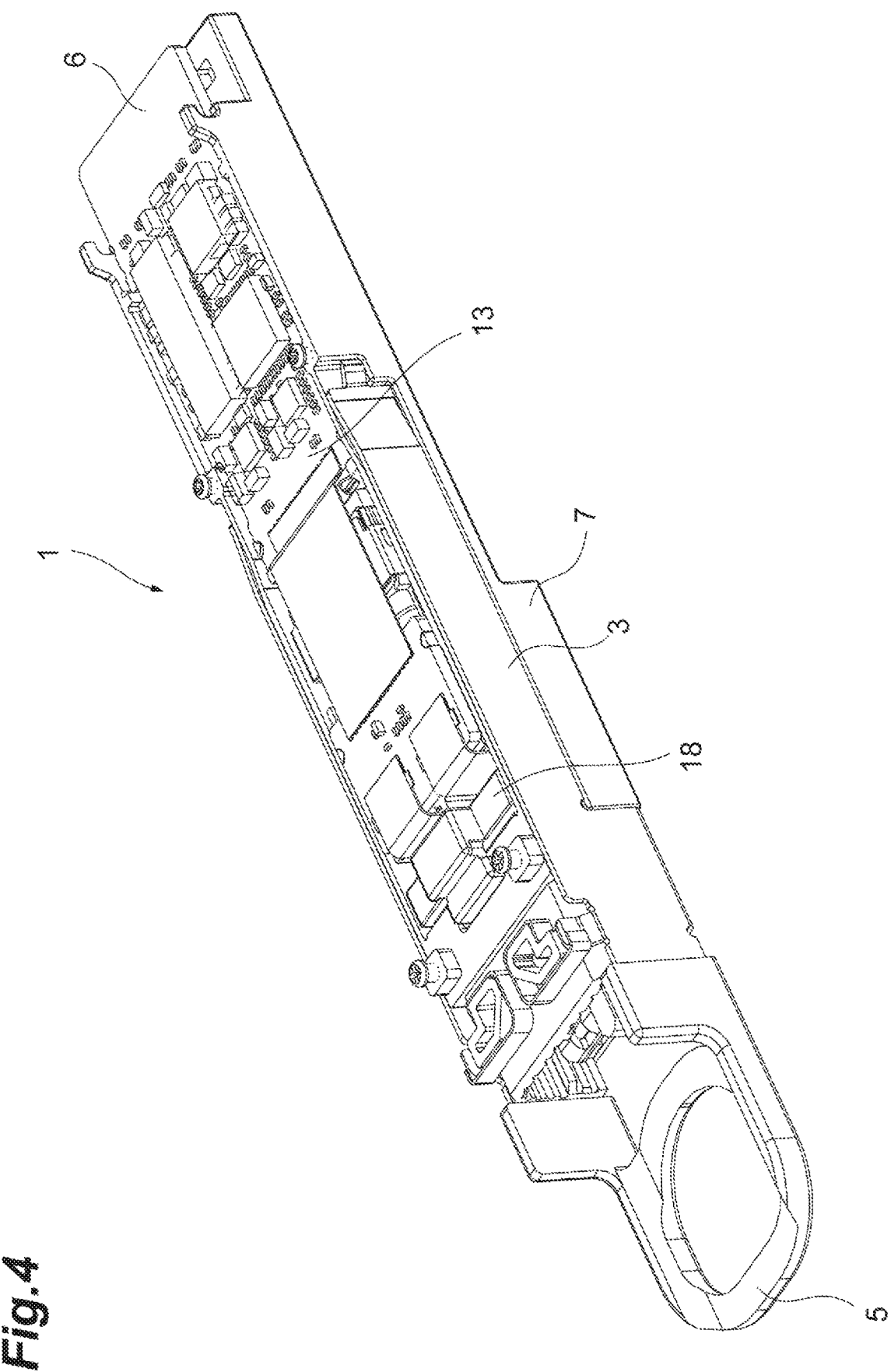
FIG. 4 is a perspective view of the internal structure of the optical transceiver in FIG. 1 viewed from the opposite side of FIG. 3.

FIG. 3 is a perspective view showing the state in which the upper housing 7 is removed from the optical transceiver 1. FIG. 4 is a perspective view showing the state in which the lower housing 8 is removed from the optical transceiver 1. As shown in FIGS. 3 and 4, in the inside of the housing 2, a plurality of optical elements including a plurality of optical elements including a transmitter optical sub-assembly (TOSA) 11 and a receiver optical sub-assembly (ROSA) 12, described later, and a plurality of internal fibers F that optically couples the plurality of optical elements to each other are provided. In the inside of the housing 2, the electric plug 6 described above is provided, and a printed circuit board 13 mounted with circuit elements, such as a PHY-IC, a first tray 14 on which the internal fibers F are housed and the TOSA 11 is placed, and a second tray 15 that covers the ROSA 12 are further provided.

The printed circuit board 13 is housed in the housing 2 such that the electric plug 6 can be fit into the electric connector in the inside of the cage. The electric plug 6 disposed, externally exposed from the housing 2. The first tray 14 is made of a resin, for example, and as an example, the first tray 14 is made of PPS (polyphenylene sulfide). The first tray 14 is provided for housing the internal fibers F in the inside of the housing 2 with the internal fibers F wound in a circular shape or an elliptic shape. The first tray 14 can house the internal fibers F as the winding number or winding state of the internal fibers F is adjusted when the length of the internal fibers F changes.

Figure 5:
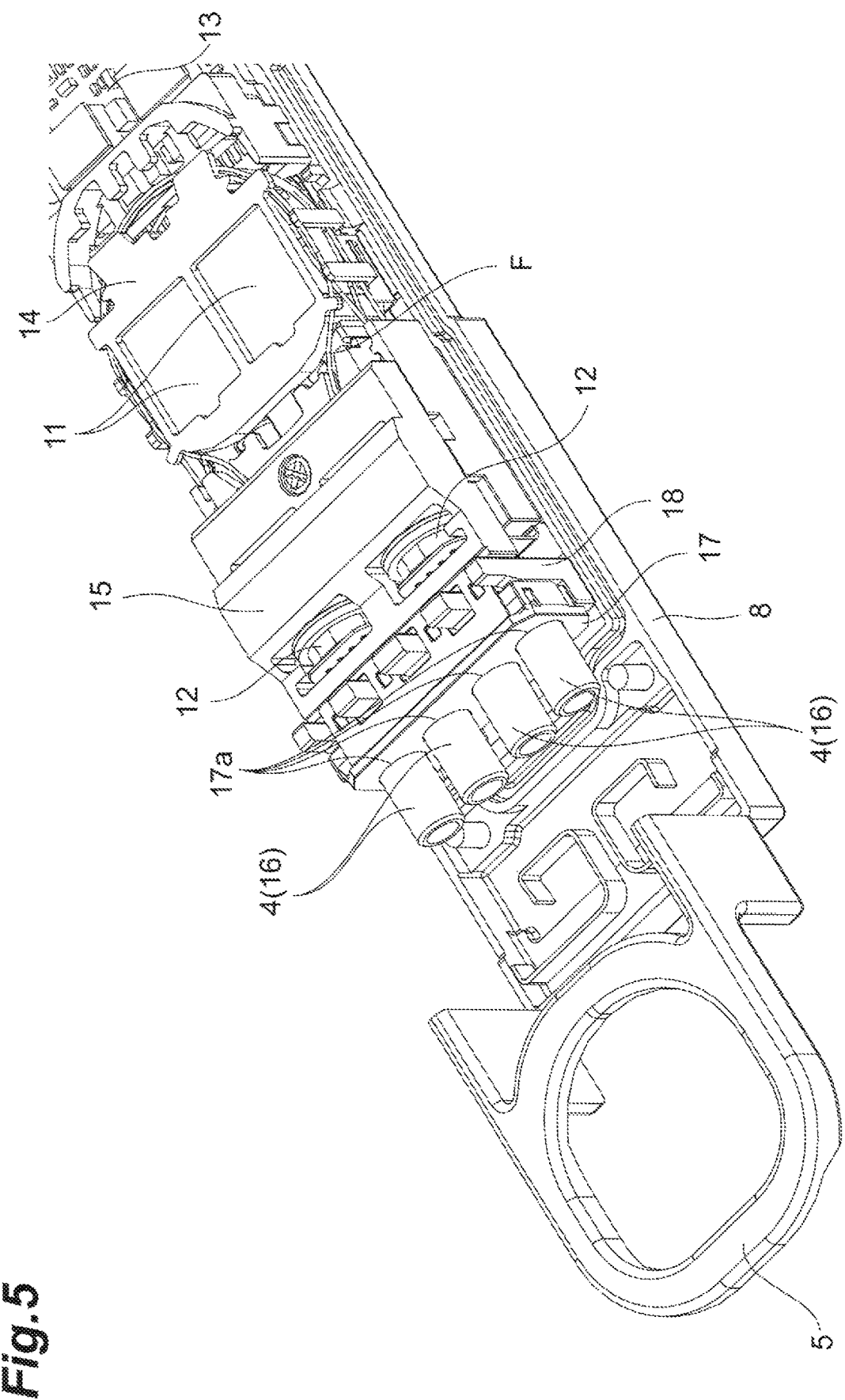
FIG. 5 is a perspective view showing an optical port, a rubber sheet, a retainer plate, a first tray, a second tray, an internal fiber, a ROSA, and a TOSA of the optical transceiver in FIG. 1.
Figure 6:
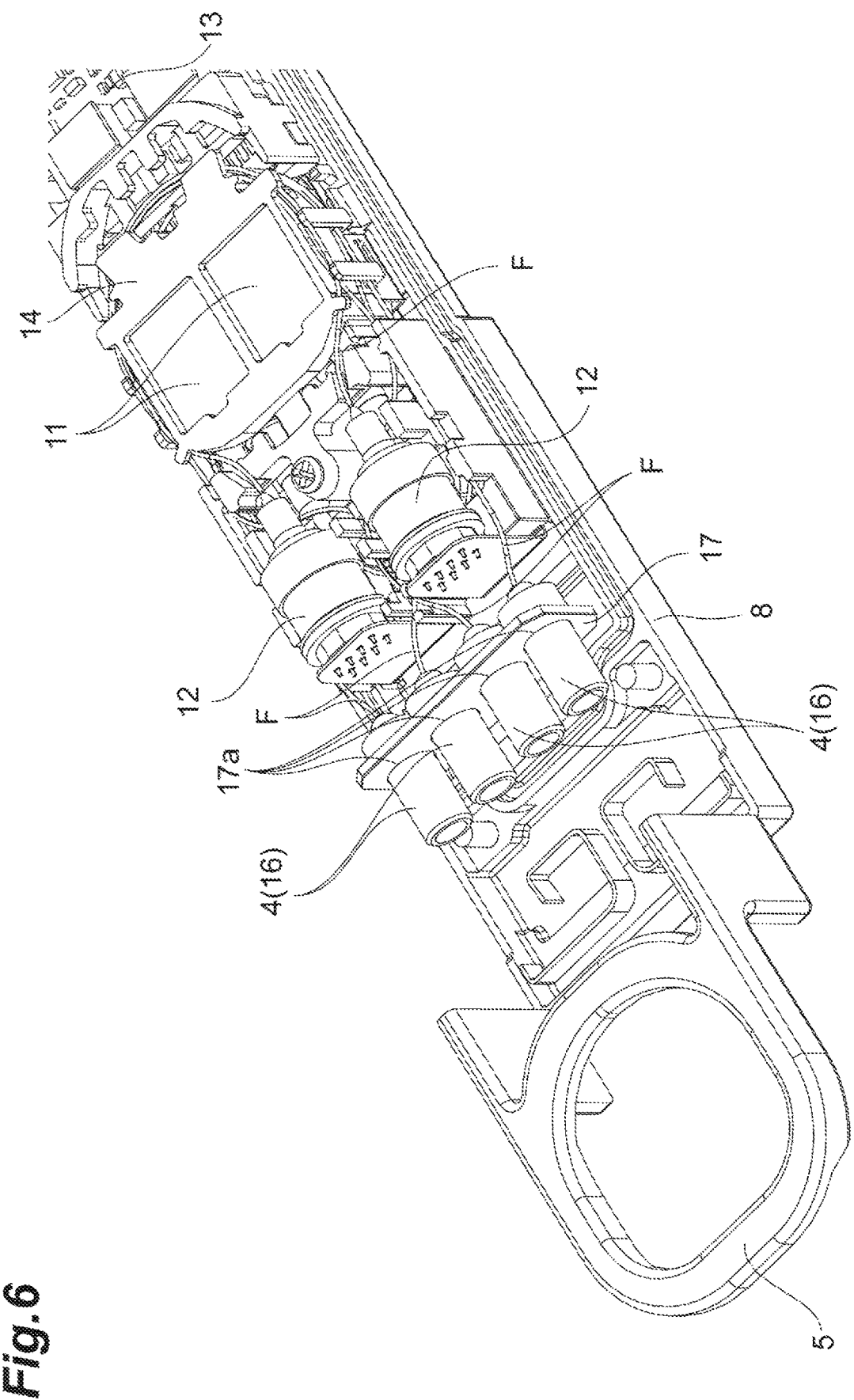
FIG. 6 is a perspective view showing the optical port, the rubber sheet, the internal fiber, the ROSA, and the TOSA with the retainer plate and the second tray removed from FIG. 5.

FIG. 5 is a perspective view with the slider 3 in FIG. 3 removed. FIG. 6 is a perspective view with the second tray 15 removed from FIG. 5. As shown in FIGS. 5 and 6, a plurality of optical receptacles 4 each has an optical port 16 that is a sleeve, and to each of a plurality of optical ports 16, the internal fibers F is connected. Further, the optical transceiver 1 include a rubber sheet 17 having hole parts 17a through which the plurality of optical ports 16 is individually passed, and a retainer plate 18 that presses the plurality of optical receptacles 4 forward through the rubber sheet 17. The rubber sheet 17 and the retainer plate 18 will be described later in detail.

Figure 7:
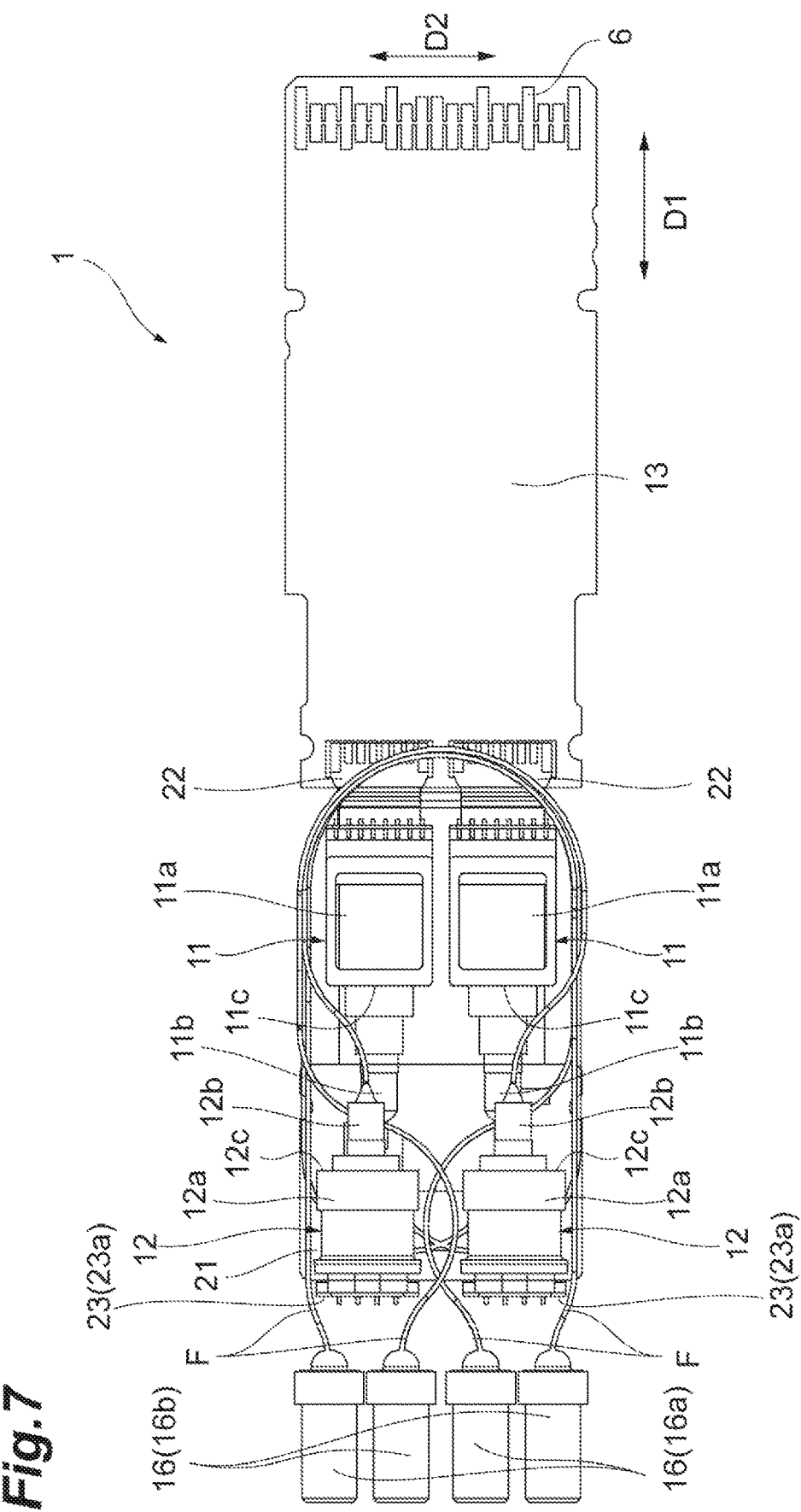
FIG. 7 is a plan view showing the optical port, the internal fiber, the relay board, the ROSA, the TOSA, a first FPC, and a printed circuit board of the optical transceiver in FIG. 1.
Figure 8:
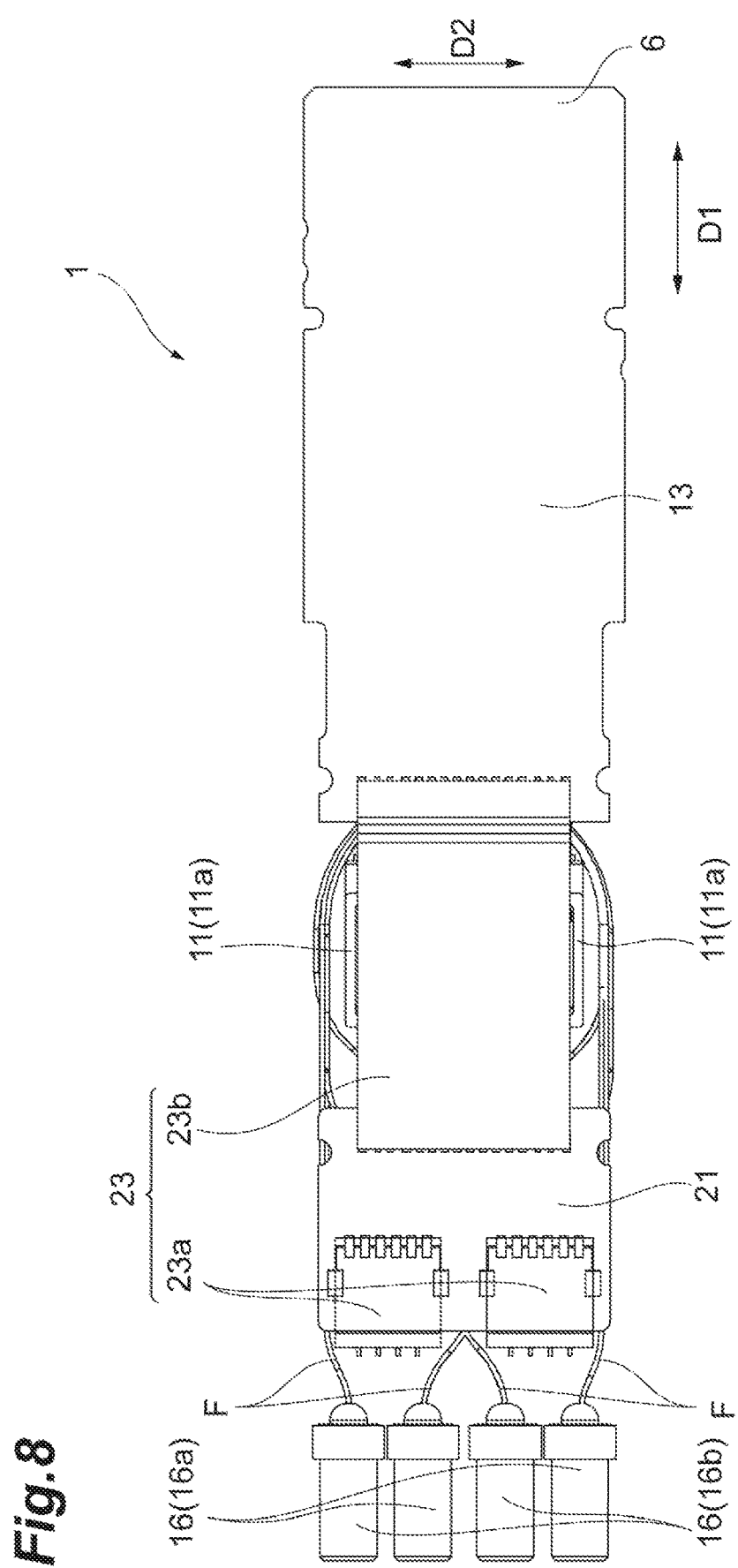
FIG. 8 is a bottom view showing the optical port, the internal fiber, a second FPC, the relay board, and the printed circuit board of the optical transceiver in FIG. 1 viewed from the opposite side of FIG. 7.

FIG. 7 is a plan view of the TOSA 11, the ROSA 12, the printed circuit board 13, the optical port 16, and the internal fibers F from the upper side. FIG. 8 is a bottom view of the TOSA 11, the ROSA 12, the printed circuit board 13, the optical port 16, and the internal fibers F from the lower side. As shown in FIGS. 7 and 8, four optical ports 16 are disposed being arranged along a direction D2 that is the width direction of the optical transceiver 1, two TOSAs 11 are disposed being arranged along the direction D2, and two ROSAs 12 are disposed being arranged along the direction D2. The direction D2 corresponds to the width direction of the optical transceiver 1. The direction D2 is orthogonal to the direction D1. The four optical ports 16, the two ROSAs 12, the two TOSAs 11, and the printed circuit board 13 are disposed so as to come close to the host system in this order along the one direction D1 that is the longitudinal direction of the optical transceiver 1.

The two TOSAs 11 are disposed so as to be individually opposed to the two ROSAs 12 along the one direction D1.

The TOSAs 11 include a package 11a and a first sleeve 11b extending from the package 11a. The package 11a shows a rectangular cuboid shape. The first sleeve 11b protrudes from a side surface 11c opposed to the front side of the package 11a to the ROSA 12 side (the front side). The two ROSAs 12 are disposed on the opposite side (the front side) of the printed circuit board 13 viewed from the two TOSAs 11. The ROSAs 12 include a package 12a and a second sleeve 12b extending from the package 12a. The package 12a shows a columnar shape. The second sleeve 12b protrudes from a side surface 12c opposed to the rear side of the package 12a to the TOSA 11 side (the rear side). When the two TOSAs 11 and the two ROSAs 12 are disposed so as to be opposed to each other, the side surface 11c of the package 11a and the side surface 12c of the package 12a are opposed to each other.

In the inside of the housing 2, a relay board 21 interposed between the ROSA 12 and the printed circuit board 13, a first flexible print circuit (FPC) 22 that electrically connects the printed circuit board 13 to the TOSAs 11, and a second FPC 23 that connects the printed circuit board 13 to the ROSAs 12 are provided. The second FPC 23 includes ROSA-side FPCs 23a (receiver optical sub-assembly-side FPC) that connect the two ROSAs 12 to the relay board 21 and a printed circuit board-side FPC 23b that connects the relay board 21 to the printed circuit board 13.

The four optical ports 16 include two first optical ports 16a connected to the TOSAs 11 through the internal fibers F and two second optical ports 16b connected to the ROSAs 12 through the internal fibers F. The second optical ports 16b receive optical signals from the outside of the optical transceiver 1. The ROSAs 12 receive the optical signals from the second optical ports 16b through the internal fibers F, and convert the received optical signals into electric signals. To the ROSAs 12, optical signals are inputted from the rear side (the side surface 12c), and the ROSAs 12 output electric signals to the front side (the optical port 16 side of the package 12a). In this manner, the optical signals received by the second optical port 16b from the outside are inputted from the front side of the optical transceiver 1 to the rear side, but the optical signals are inputted from the rear side to the front side of the ROSA 12. To the optical signals, the second optical port 16b is optically coupled to the corresponding ROSA 12 through the internal fiber F, and the orientation of the optical signal is inverted (folded back) at an angle of 180° by bending the internal fiber F. In the direction D2, since the gap between the ROSAs 12 is wider than the gap between the optical ports 16, the optical axis of the optical port 16 is not matched with the optical axis of the ROSA 12. However, with the use of the internal fiber F, the difference is absorbed, and the second optical port 16b is optically coupled to the ROSA 12. The electric signals outputted from the ROSAs 12 are outputted to the printed circuit board 13 through the ROSA-side FPC 23a, the relay board 21, and the printed circuit board-side FPC 23b. The circuit mounted on the printed circuit board 13 applies signal processing to the electric signals, and the electric signals are outputted to the host system through the electric plug 6. At this time, the ROSA 12 outputs the electric signals from the rear side of the optical transceiver 1 toward the front side, and the electric signals are inputted from the front side to the rear side of the printed circuit board 13. To the electric signals, the orientation of the electric signals is inverted (folded back) at an angle of 180° by electrically connecting the output of the ROSA 12 to the corresponding printed circuit board 13 through the second FPC 23 and the relay board 21. The two first optical ports 16a and the two second optical ports 16b are alternately disposed along the direction D2. Thus, one of the two first optical ports 16a and one of the two second optical ports 16b are optically coupled to one CS connector, and the other of the two first optical ports 16a and the other of the two second optical ports 16b are optically coupled to the other CS connector.

The ROSA 12 includes a light receiving device, such as a photodiode, for example. The ROSA 12 may further include an amplifier circuit, for example, that amplifies electric signals outputted from a light receiving device, such as a photodiode. The ROSA 12 has a columnar package 12a, for example, and the package 12a houses a light receiving device, such as a photodiode, an amplifier circuit, and any other device, in its inside. The package 12a externally includes a terminal that outputs electric signals, for example, and the light receiving device, the amplifier circuit, and any other device are electrically connected to the terminal through internal wiring. From the package 12a, the internal fiber (the optical fiber) F extends, and externally received signal light (light reception signals) is inputted to the inside of the package 12a through the internal fiber F. The package 12a may have a built-in optical system that optically couples the light receiving device in the inside to the internal fiber F. The ROSA 12 may include an optical demultiplexer that demultiplexes one wavelength multiplexed optical signal into a plurality of optical signals having different the wavelengths from each other, and may include a plurality of light receiving devices that converts the plurality of optical signals into electric signals. In the present disclosure, the description is made with the name of ROSA, and the ROSA may be a device generally light receiving module.

On the other hand, from the host system to the printed circuit board 13, transmission electric signals are inputted through the electric plug 6. The electric signals are processed by the circuit mounted on the printed circuit board 13, and then transmitted to the TOSAs 11 through the first FPCs 22. The TOSAs 11 converts the electric signals into optical signals, and then output the optical signals to the outside of the optical transceiver 1 through the internal fibers F and the first optical ports 16a. The TOSA 11 includes an optical transmission device, such as a semiconductor laser diode (LD) and an optical modulator, for example. The TOSA 11 may further include a drive circuit that drives a semiconductor laser diode or an optical modulator and a Peltier element that controls temperatures, and any other device, for example. The TOSA 11 includes the package 11a in a rectangular cuboid shape, and the package 11a houses an optical transmission device, such as a semiconductor laser diode and an optical modulator, a drive circuit, and any other device in its inside. The package 11a externally includes a terminal to which electric signals, for example, are inputted, and the optical transmission device, the drive circuit, and any other device are electrically connected to the terminal by internal wiring. From the package 11a, the internal fiber (the optical fiber) F extends, and signal light (light transmission signals) converted from electric signals by the optical transmission device in the inside are outputted to the outside of the package 11a through the internal fiber. The package 11a may have a built-in optical system that optically couples the optical transmission device in the inside to the internal fibers F. The TOSA 11 may include a plurality of semiconductor laser diodes that outputs light beams at wavelengths different from each other, for example, and the optical system in the inside may include an optical multiplexer that multiplexes a plurality of optical signals at wavelengths different from each other to generate one wavelength multiplexed optical signal. In the present disclosure, the description is made with the name of TOSA, and the TOSA may be a device generally referred to as a light transmission module. To the TOSAs 11, electric signals are inputted from the rear side (the electric plug 6 side of the package 11a), and the TOSAs 11 outputs optical signals from the side surface 11c to the front side. The optical signals outputted from the TOSA 11 are outputted from the rear side of the optical transceiver 1 toward the front side, and the optical signals are inputted from the rear side toward the front side of the first optical port 16a. Therefore, the orientation of the optical signals outputted from the TOSA 11 is the same as the orientation of the optical signals inputted to the first optical port 16a. However, in the direction D2, since the gap between the TOSAs 11 is wider than the gap between the optical ports 16, the optical axis of the optical port 16 is not matched with the optical axis of the TOSA 11. However, with the use of the internal fibers F, the difference is absorbed, and the output of the TOSA 11 is optically coupled to the first optical port 16a.

Figure 9:
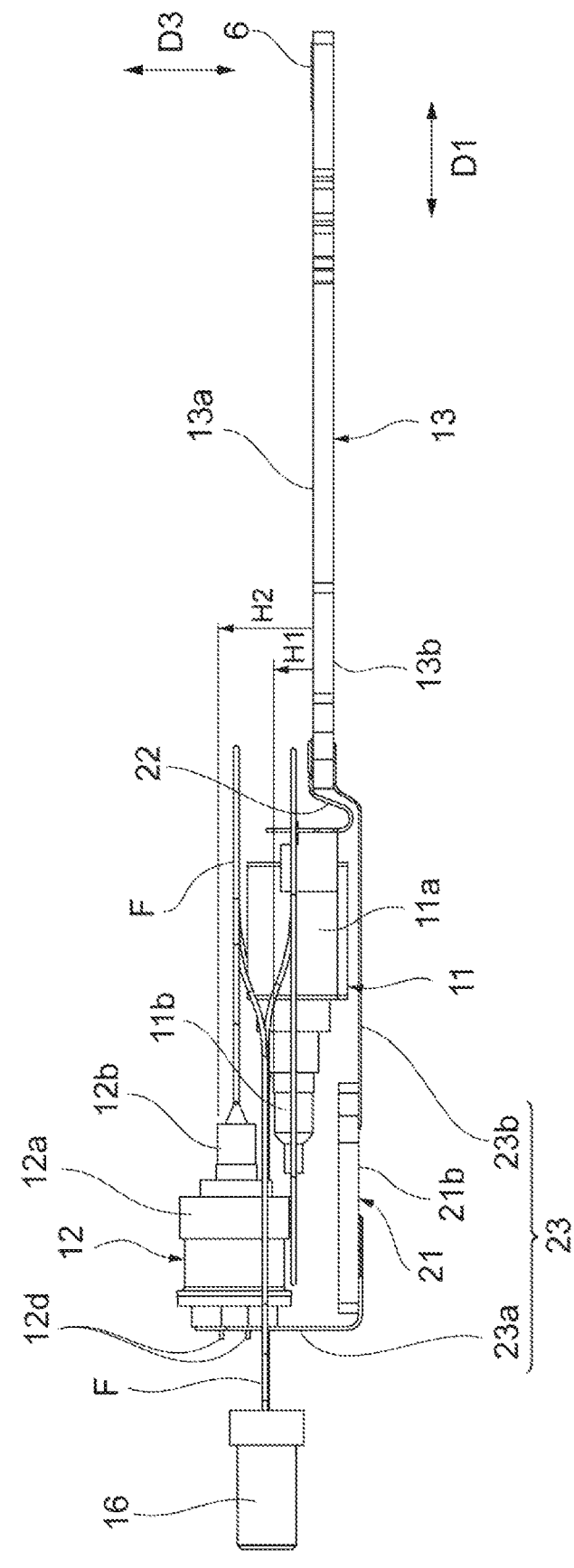
FIG. 9 is a side view showing the optical port, the internal fiber, the second FPC, the relay board, the ROSA, the TOSA, the first FPC, and the printed circuit board of the optical transceiver in FIG. 1.

FIG. 9 is a side view of the TOSA 11, the ROSA 12, the printed circuit board 13, the optical port 16, the relay board 21, the first FPC 22, the second FPC 23, and the internal fibers F viewed from the direction D2 that is the width direction of the optical transceiver 1. Actually, the inside of the housing 2 is not seen due to the side surface of the housing 2 when these components are so viewed, but the side surface of the housing 2 is seen through. As shown in FIG. 9, a height H1 of the first sleeve 11b of the TOSA 11 to the printed circuit board 13 and a height H2 of the second sleeve 12b of the ROSA 12 to the printed circuit board 13 are different from each other, and the height H2 is set higher than the height H1. That is, the height H2 of the ROSA 12 to the printed circuit board 13 is higher than the height H1 of the TOSA 11 to the printed circuit board 13. On this account, the TOSA 11 and the ROSA 12 are disposed such that a part of the TOSA 11 (the second sleeve 12b) overlaps a part of the ROSA 12 (the first sleeve 11b) when viewed from a direction D3 that is the height direction. Note that regarding the direction D2, the breath of the first sleeve 11b is smaller than the breath of the package 11a, and the breath of the second sleeve 12b is smaller than the breath of the package 12a.

The first FPC 22 is connected to the rear side (electric input) of the TOSAs 11, being bent from a top surface 13a of the printed circuit board 13 to the lower side in a U-shape. The top surface 13a is a face in parallel with the direction D1 and in the direction D2. The printed circuit board-side FPC 23b extends obliquely below from an under surface 13b of the printed circuit board 13 and extends in front below the TOSAs 11. The front end of the printed circuit board-side FPC 23b is connected to an under surface 21a of the relay board 21. From the relay board 21, the ROSA-side FPC 23a extends in front in the direction D1 and is bent upward in the direction D3 (e.g. at an angle of 90°). On the upper part of the ROSA-side FPC 23a, a hole parts into which lead pins 12d of the ROSAs 12 are inserted are formed. The lead pins 12d are soldered with the lead pins 12d inserted into the hole parts of the ROSA-side FPC 23a, the ROSA-side FPC 23a is connected to the front side (electric output) of the ROSAs 12.

Figure 10:
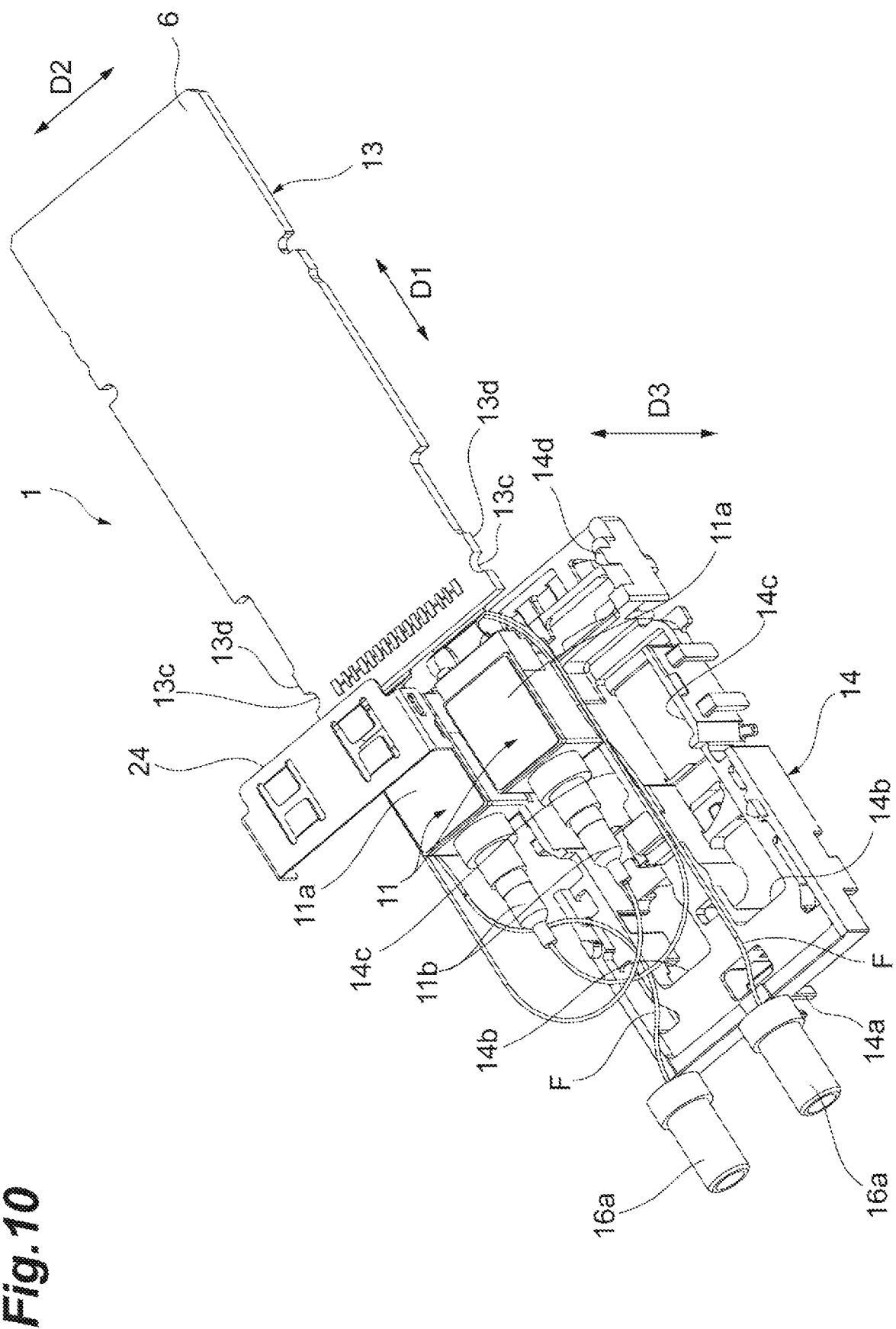
FIG. 10 is a perspective view showing the optical port, the internal fiber, the first tray, the TOSA, a retainer metal plate, and the printed circuit board of the optical transceiver in FIG. 1.

As shown in FIG. 10, the optical transceiver 1 includes the first tray 14 that retains the two TOSAs 11 and a metal fitting 24 that retains the two TOSAs 11 from the lower side to the upper side in the direction D3. In FIG. 10 and FIGS. 11, 12, 18, and 19, described later, the vertical orientation is inverted from FIG. 9, for example. In the embodiment, the upper side in FIGS. 10 to 12, 18, and 19 correspond to the lower side of the optical transceiver 1, and the lower side in FIGS. 10 to 12, 18, and 19 correspond to the upper side of the optical transceiver 1. The first tray 14 retains two side surfaces of the package 11a of the TOSA 11 in the direction D2 the top surface facing the upper housing 7. The normals of these two side surfaces are in parallel with the direction D2. The metal fitting 24 that is a retaining metal fitting retains the under surface facing the lower housing 8 of the package 11a of the TOSA 11. The normals of the top surface and the under surface are in parallel with the direction D3. FIG. 10 is a perspective view showing the first tray 14, the two first optical ports 16a, the internal fibers F, the printed circuit board 13, the two TOSAs 11, and the metal fitting 24 viewed from below. The first tray 14 has a groove 14a that houses the internal fiber F, a hole part 14b into which the internal fiber F extending from the first sleeve 11b of the TOSA 11 is inserted, and a through hole 14c on which the TOSAs 11 are placed.

The groove 14a is provided at the front end of the first tray 14. The hole part 14b is an opening provided on the rear side of the groove 14a, and penetrates the first tray 14 in the direction D3. The first tray 14 has a pair of hole parts 14b arrayed so as to be arranged in the direction D2. For example, the hole parts 14b is in a rectangle with rounded corners in the cross section perpendicular to the direction D3. The through hole 14c forms a rectangle in the cross section perpendicular to the direction D3, and a pair of through holes 14c is disposed so as to be arranged in the direction D2. The through hole 14c provides a space in which the package 11a can be housed. The through hole 14c has an opening opposed to the top surface of the package 11a of the TOSA 11. The area of the opening of the through hole 14c is smaller than the area of the top surface of the package 11a. The bottom part of the hole part 14b has a flat part adjacent to the through hole 14c, and the flat part retains a part of the top surface of the package 11a. This prevents the top surface of the package 11a falling off from the opening of the through hole 14c when the package 11a is housed in the through hole 14c. Between the package 11a placed on the through hole 14c and the inner surface of the housing 2, a gap is formed. However, a heat dissipation material, a heat dissipation gel, for example, is packed such that the gap is filled. Therefore, the top surface of the package 11a placed on the through hole 14c thermally contacts the inner surface of the housing 2 through the heat dissipation material packed in the through hole 14c. The package 11a is housed in the through hole 14c, and hence the position of the TOSA 11 in the direction D1 in the inside of the housing 2 is determined.

Figure 11:
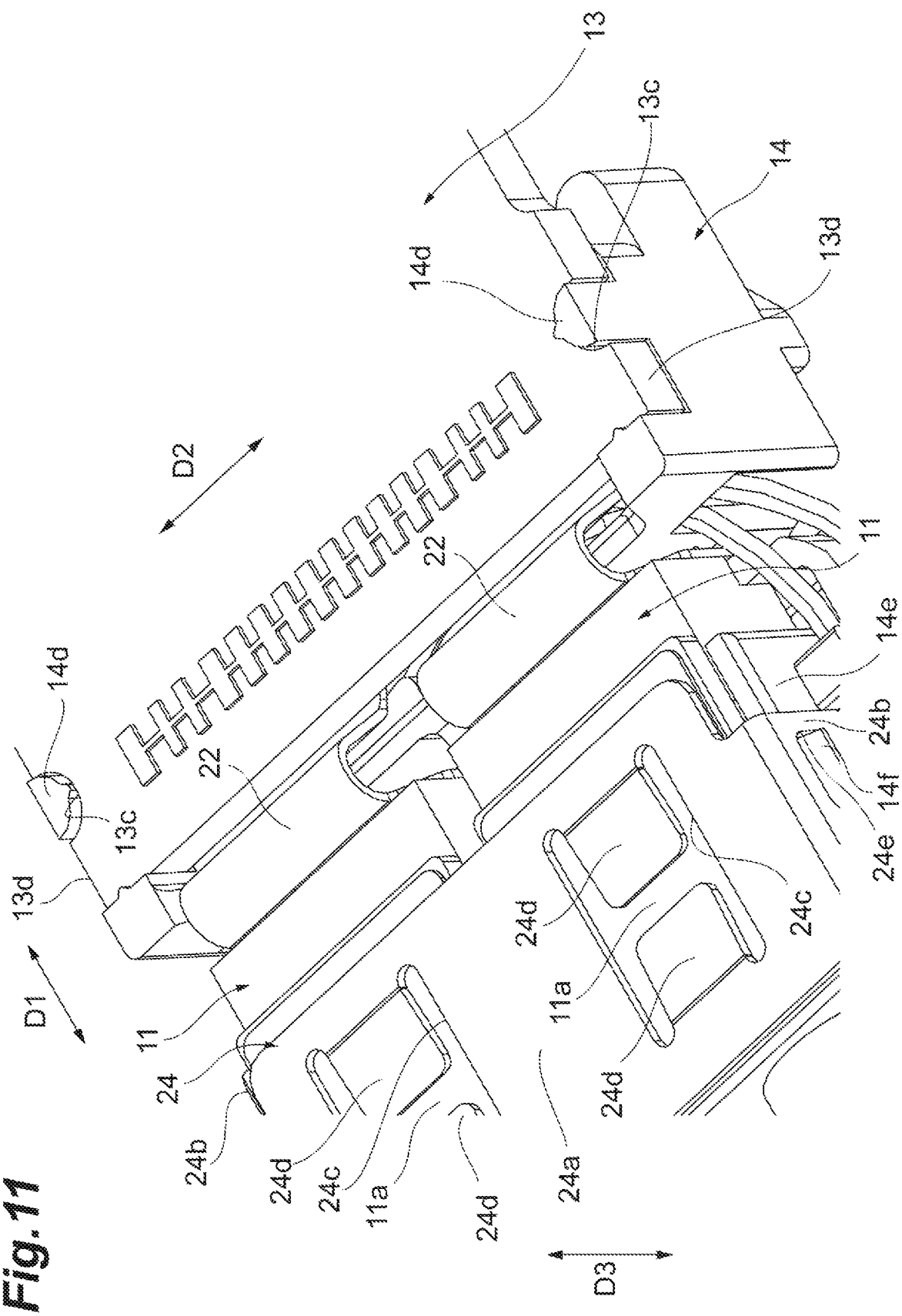
FIG. 11 is an enlarged perspective view of the connecting part of the TOSA, the retainer metal plate, the first tray, and the printed circuit board in FIG. 10.

FIG. 11 is an enlarged perspective view of the printed circuit board 13, the first tray 14, and the metal fitting 24 in FIG. 10. As shown in FIGS. 10 and 11, the first tray 14 is provided with a projection 14d that is fit into the printed circuit board 13. The projection 14d is a semicircular projection provided on the rear of the first tray 14, for example, and fit into a semicircular recess 13c located at the front of the printed circuit board 13. The first tray 14 includes a pair of projections 14d disposed being arranged along the direction D2, and the recess 13c is formed on an end face 13d opposed to the direction D2 of the printed circuit board 13. Therefore, the projection 14d of the first tray 14 is fit into the recess 13c of the end face 13d of the printed circuit board 13 from the side of both end sides in the direction D2, and hence the printed circuit board 13 and the first tray 14 are firmly connected to each other. By fitting the recess 13c into the projection 14d, the position of the printed circuit board 13 in the direction D1 in the inside of the housing 2 is determined.

Figure 12:
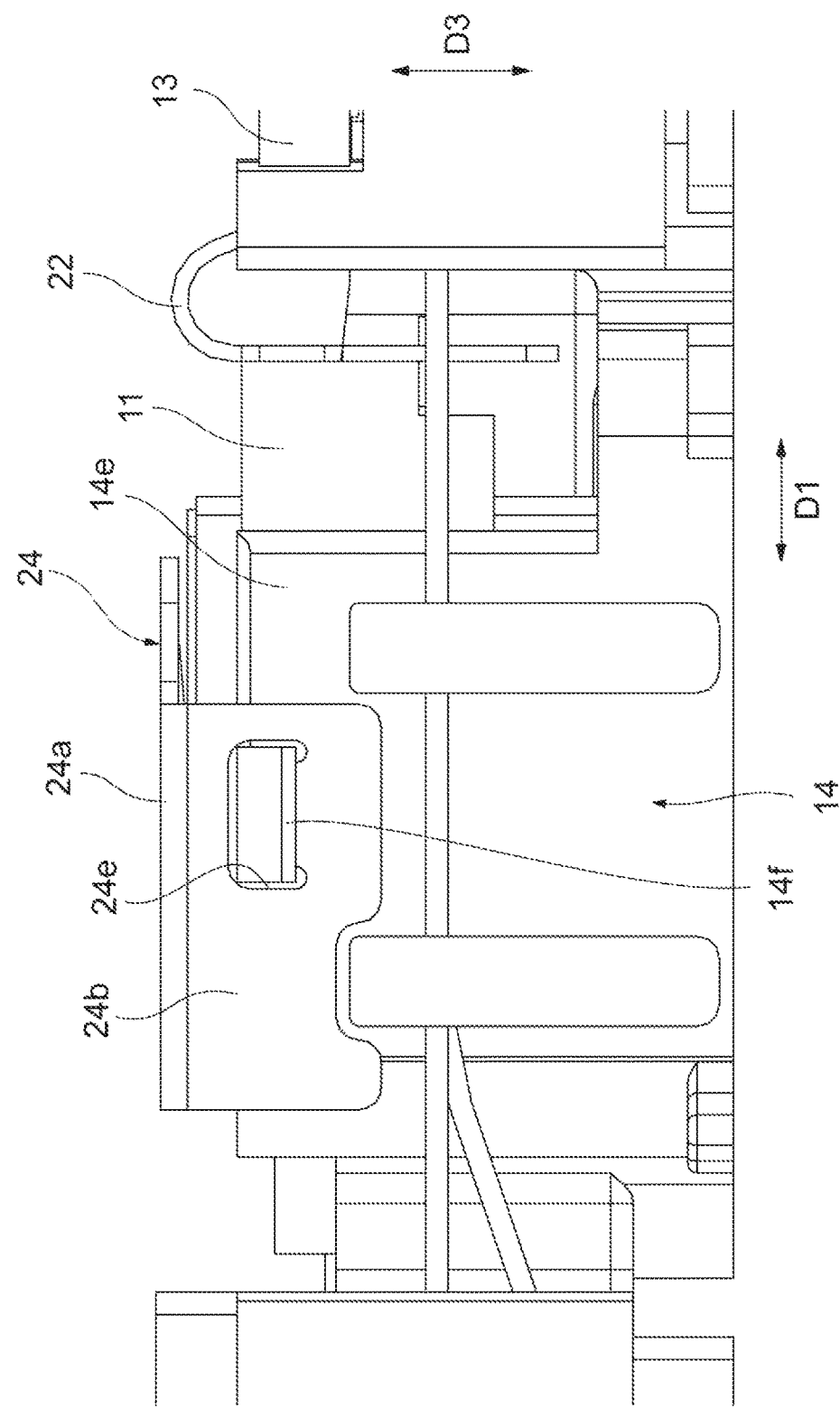
FIG. 12 is an enlarged side view of the connecting part of the TOSA, the retainer metal plate, and the first tray in FIG. 10.

FIG. 12 is a side view of the first tray 14 and the metal fitting 24 viewed from the direction D2. As shown in FIGS. 10, 11, and 12, the metal fitting 24 has a flat plate part 24a opposed to the top surface of the TOSA 11 and a folded part 24b located at end parts of the flat plate part 24a in the direction D2. The metal fitting 24 viewed from the TOSA 11 is provided on the opposite side (on the lower side) of the first tray 14, and the metal fitting 24 retains the TOSA 11, pressing the TOSA 11 to the first tray 14. For example, the flat plate part 24a is in a rectangle extending long in the direction D2. The metal fitting 24 has a pair of folded parts 24b arranged along the direction D2, and the folded parts 24b are folded upward from the front side portion of the flat plate part 24a.

The flat plate part 24a has a pair of hole parts 24c arranged along the direction D2, and the hole parts 24c expose a part of the under surface of the package 11a of the TOSA 11. At the hole parts 24c, a spring part 24d extends in the one direction D1, and for example, the pair of the spring part 24d is disposed in line symmetry to each other along the one direction D1. The spring part 24d is inclined from the flat plate part 24a diagonally above (on the inner side of the housing) as the spring part 24d goes to the tip end. The first tray 14 includes a pair of side wall parts 14e arranged along the direction D2, and on the side wall part 14e, a protruding part 14f externally protruding to both end sides in the direction D2. The folded parts 24b of the metal fitting 24 have a through hole 24e penetrating in the direction D2, the protruding parts 14f are fit into the through hole 24e, and the metal fitting 24 is fixed to the side wall part 14e. At this time, the spring part 24d inclined upward contacts the under surface of the package 11a of the TOSA 11, and the metal fitting 24 fixed to the side wall part 14e presses the package 11a to the first tray 14 side (on the upper side). As a result, the package 11a can be firmly retained between the metal fitting 24 and the first tray 14.

Figure 13:
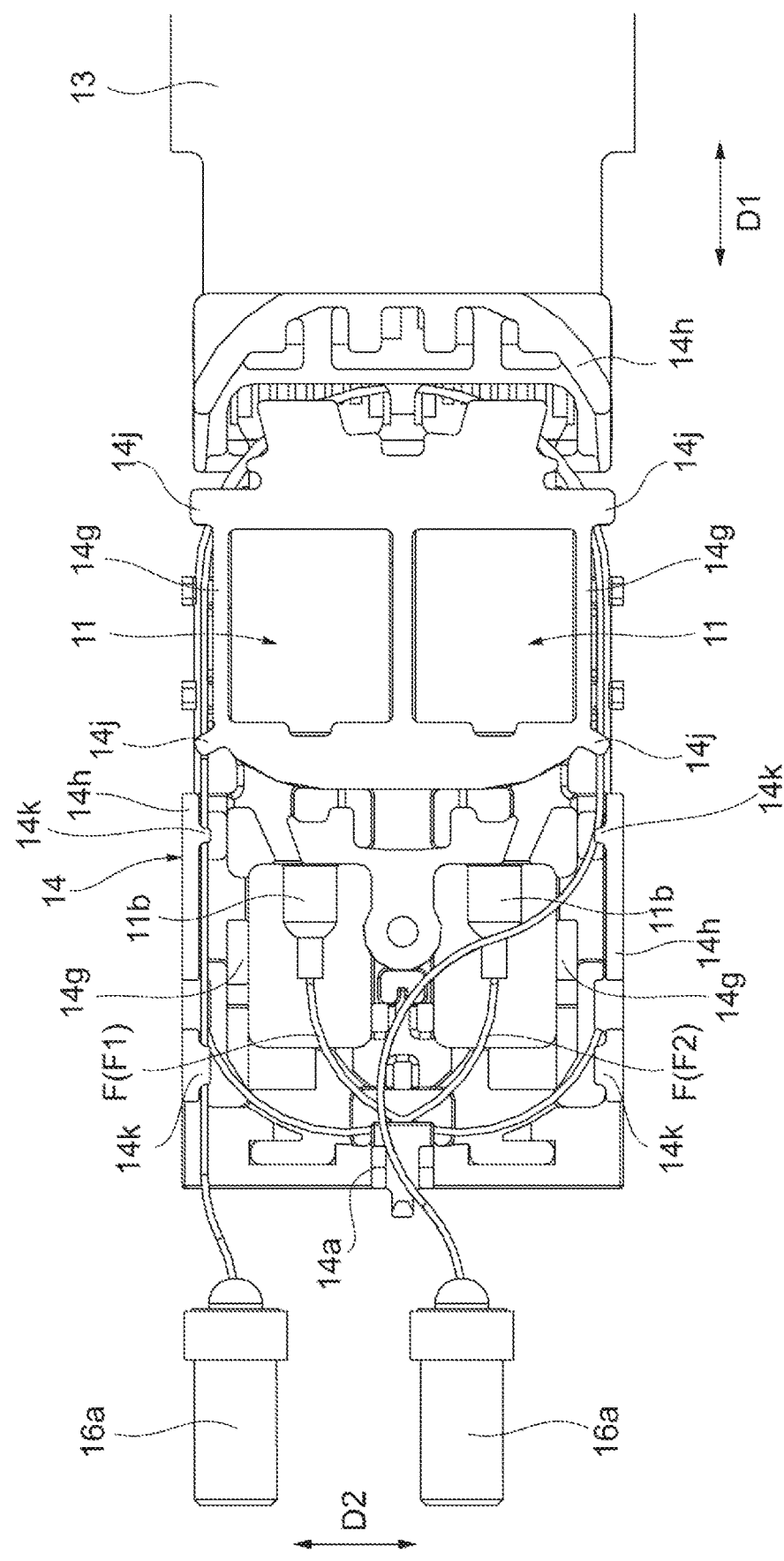
FIG. 13 is a plan view showing the optical port, the internal fiber, the first tray, the TOSA, and the printed circuit board in FIG. 10.

FIG. 13 is a diagram showing the two first optical ports 16a, the internal fibers F, the two TOSAs 11, the first tray 14, and the printed circuit board 13. For example, in the inside of the optical transceiver 1, four internal fibers F are provided. In the following description, when four internal fibers F are discriminated, the internal fibers F are sometimes described by internal fibers F1, F2, F3, and F4. However, the description of the internal fibers F1, F2, F3, and F4 is for convenience, and does not limit the disposition, for example, of the internal fibers F.

As shown in FIG. 13, from the first sleeve 11b of the TOSA 11 located on one side in the direction D2 (e.g. on the upper side in FIG. 13), the internal fiber F1 (first fiber) extends in front, and the internal fibers F1 is folded on the other side in the direction D2 (e.g. on the lower side in FIG. 13) and the rear side (the printed circuit board 13 side). The internal fiber F1 folded on the rear side is folded such that the internal fiber F1 is routed around the two TOSAs 11 at the rear end part of the first tray 14 on the one side in the direction D2 and the front side. The folded internal fiber F1 linearly extending in front, and is connected to the first optical port 16a on the one side in the direction D2.

From the first sleeve 11b of the TOSA 11 located on the other side in the direction D2, the internal fiber F2 (first fiber) extends in front, and the internal fiber F2 is folded on the one side in the direction D2 and the rear side (the printed circuit board 13 side). The internal fiber F2 folded on the rear side is folded such that the internal fiber F2 is routed around the two TOSAs 11 at the rear end part of the first tray 14 on the other side in the direction D2 and the front side. The folded internal fiber F2 is temporarily bent on the inner side of the first tray 14 in the direction D2, and then connected to the first optical port 16a on the other side in the direction D2. Note that in routing the internal fibers F, in the case in which the length of the internal fibers F is much longer, the internal fibers F may be further routed around the two TOSAs 11. That is, the internal fibers F may be wound for two rounds or more such that the internal fibers F are routed around the two TOSAs 11 on the face where the direction D3 is the normal.

The first tray 14 has the groove 14a in the center in the direction D2 at one end in the direction D1. The first tray 14 has a plurality of inner walls 14g and a plurality of external walls 14h. The plurality of inner walls 14g and the plurality of external walls 14h form the route of the internal fibers F. The plurality of inner walls 14g and the plurality of external walls 14h guide the internal fibers F so as to be routed around the two TOSAs 11. On a part of the plurality of inner walls 14g, a nail part 14j protruding on the outer side of the first tray 14 is formed, and on a part of the plurality of external walls 14h, a nail part 14k protruding on the inner side of the first tray 14 is formed. The internal fibers F are passed on the outer side of the first tray 14 on the inner wall 14g, on the inner side of the first tray 14 on the plurality of external walls 14h, and on the lower side of the nail parts 14j and 14k, and hence the running out of the internal fibers F from the first tray 14 can be suppressed.

Figure 14:
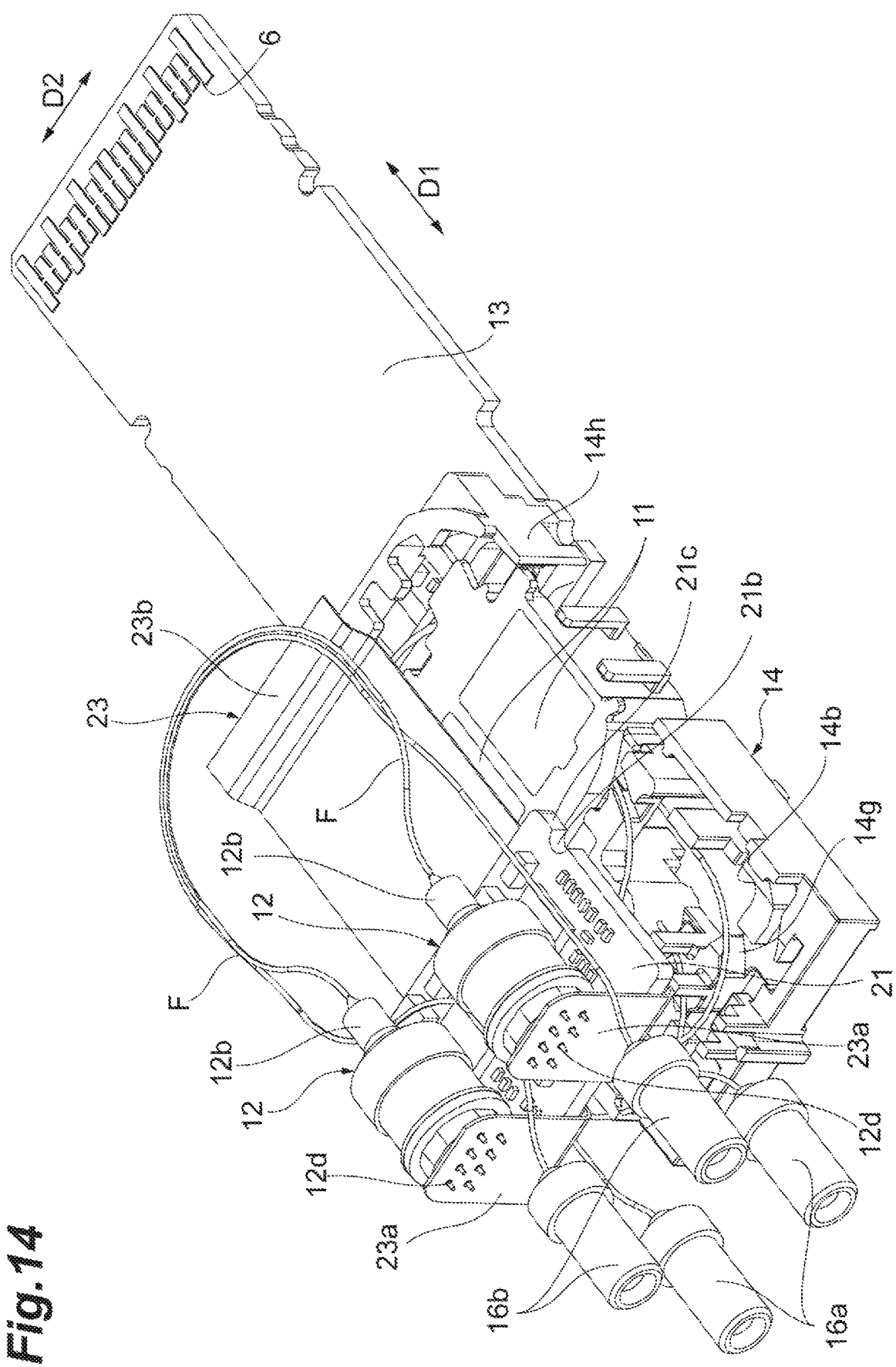
FIG. 14 is a perspective view showing the state in which the ROSA, the relay board, and the second FPC are laid on the optical port, the internal fiber, the first tray, the TOSA, and the printed circuit board in FIG. 13.
Figure 15:
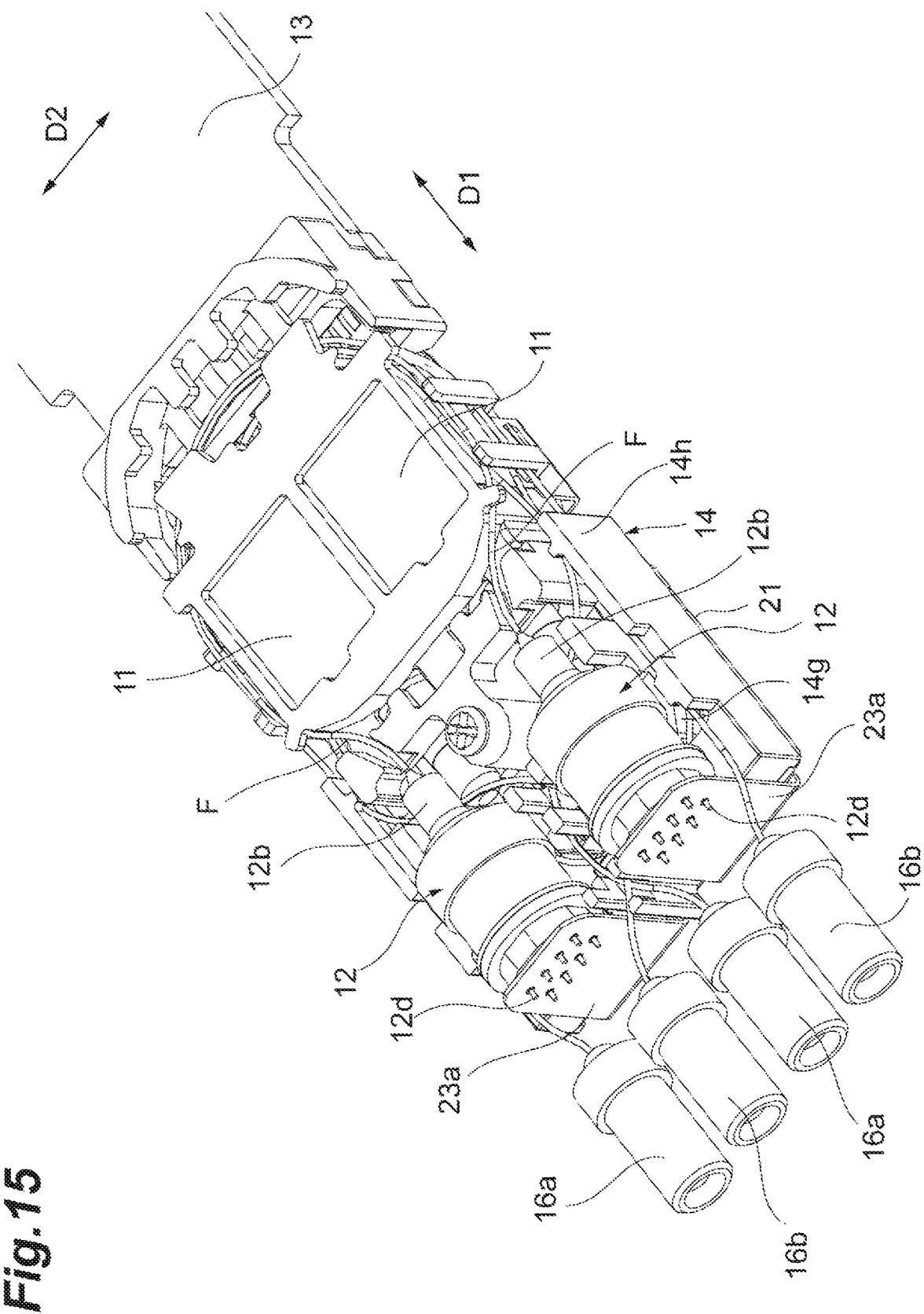
FIG. 15 is a perspective view showing the state in which the ROSA, the relay board, and the second FPC in FIG. 14 are disposed in the inside of the first tray.

FIG. 14 is a perspective view showing the two ROSAs 12, the internal fibers F extending from the ROSAs 12, the relay board 21, and the second FPC 23. FIG. 15 is a perspective view showing the state in which the two ROSAs 12, the internal fibers F, the relay board 21, and the second FPC 23 in FIG. 14 are attached to the first tray 14. As shown in FIGS. 14 and 15, the ROSAs 12 are disposed in front of the TOSAs 11, and retained on the first tray 14 with the ROSAs 12 entered in the hole parts 14b of the first tray 14. The ROSA 12 is housed in the hole part 14b, and hence the position of the ROSA 12 is determined in the direction D1 in the inside of the housing 2.

Figure 16:
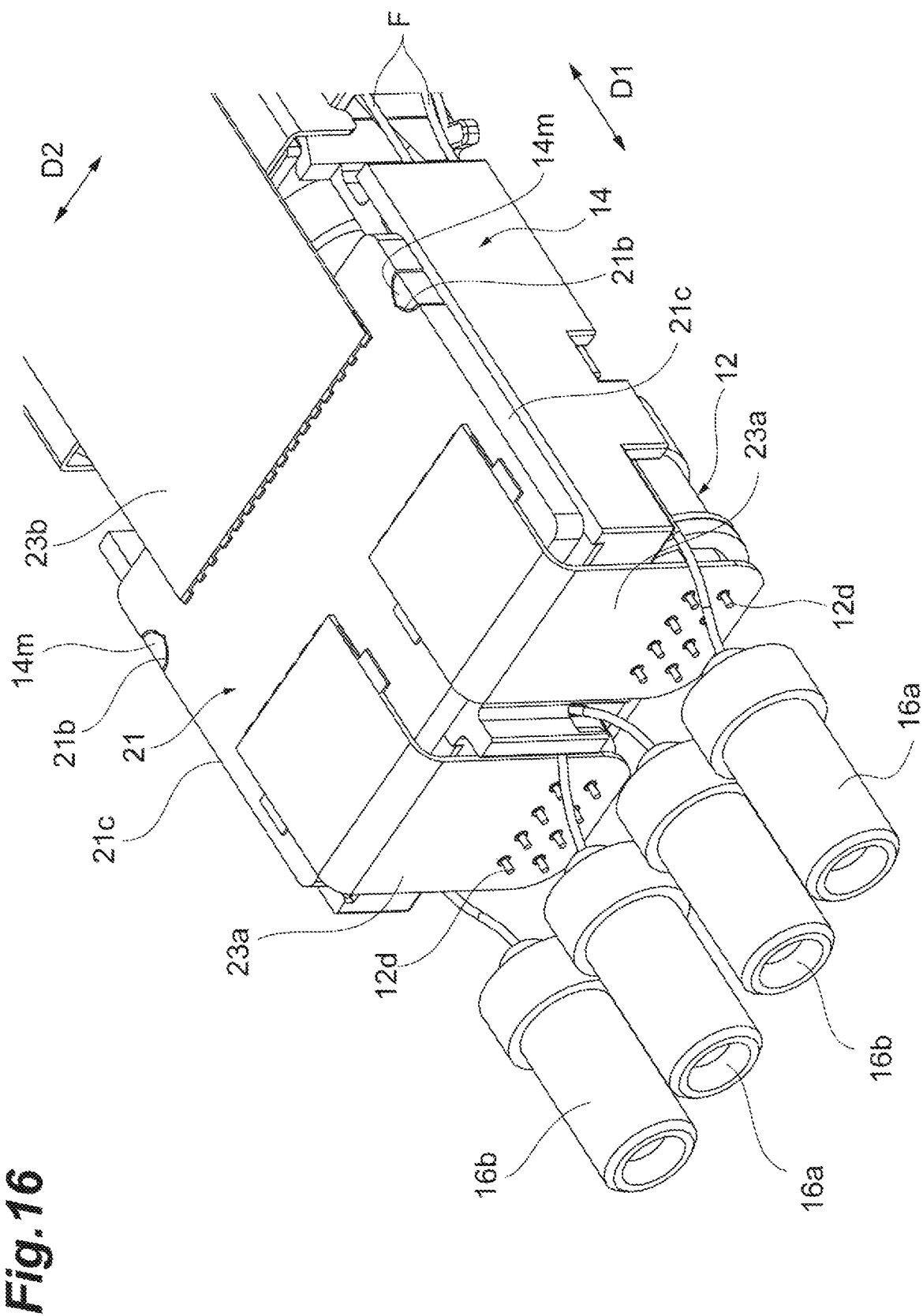
FIG. 16 is a perspective view of the optical port, the internal fiber, the ROSA, the second FPC, and the relay board in FIG. 15 viewed from the opposite side of viewed from FIG. 15.

FIG. 16 is a perspective view of the ROSA 12, the first tray 14, and the relay board 21 in FIG. 15 viewed from the opposite side in FIG. 15. As shown in FIG. 16, the first tray 14 is provided with a projection 14m fit into the relay board 21. The projection 14m is a semicircular projection provided at more frontward of the projection 14d described above, for example, and fit into a semicircular recess 21b located on the rear of the relay board 21. The first tray 14 includes a pair of projections 14m disposed being arranged along the direction D2, and the recess 21b is formed on the end faces 21c of the relay board 21 facing in the direction D2. Therefore, the projections 14m of the first tray 14 are fit into the recesses 21b of the end faces 21c of the relay board 21 from both end sides in the direction D2, and hence the relay board 21 and the first tray 14 are firmly connected to each other in front of the printed circuit board 13. By fitting the recess 21b into the projection 14m, the position of the relay board 21 to the ROSA 12 is determined.

Figure 17:
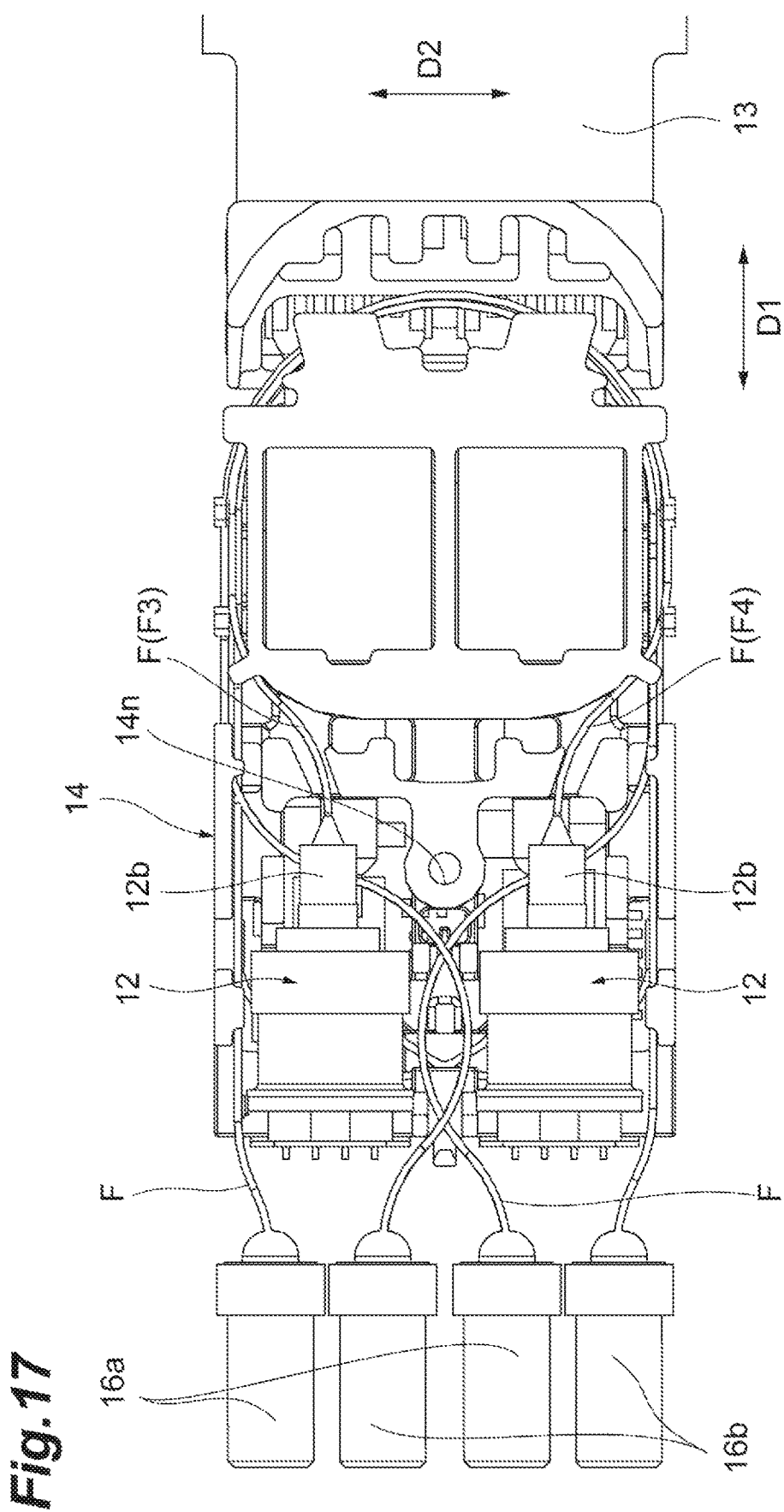
FIG. 17 is a plan view showing the optical port, the internal fiber, the first tray, the ROSA, and the printed circuit board in FIG. 14.

FIG. 17 is a diagram showing the two first optical ports 16a, the two second optical ports 16b, the internal fibers F, the two ROSAs 12, the first tray 14, and the printed circuit board 13. As shown in FIG. 17, from the second sleeve 12b of the ROSA 12 located on the one side in the direction D2 (e.g. on the upper side in FIG. 17), the internal fiber F3 (second fiber) extends on the rear side (on the printed circuit board 13 side in the direction D1), routed on the end part side of the TOSA 11 in the direction D2, and folded such that the internal fiber F3 is routed around the two TOSAs 11 at the rear end part of the first tray 14 on the other side in the direction D2 (e.g. on the lower side in FIG. 17) and the front side. The internal fiber F3 folded so as to be routed around the two TOSAs 11 linearly extends in front (on the optical port 16 side in the direction D1), and connected to the second optical port 16b on the other side in the direction D2.

From the second sleeve 12b of the ROSA 12 located on the other side in the direction D2, the internal fiber F4 (second fiber) extends on the rear side (on the printed circuit board 13 side in the direction D1), routed on the end part side of the TOSA 11 in the direction D2, and folded such that the internal fiber F4 is routed around the two TOSAs 11 at the rear end part of the first tray 14 on the one side in the direction D2 and the front side. The internal fiber F4 folded so as to be routed around the two TOSAs 11 is temporarily bent on the inner side of the first tray 14 in the direction D2 while in front (on the optical port 16 side in the direction D1), and then connected to the second optical port 16b on the one side in the direction D2.

Figure 18:
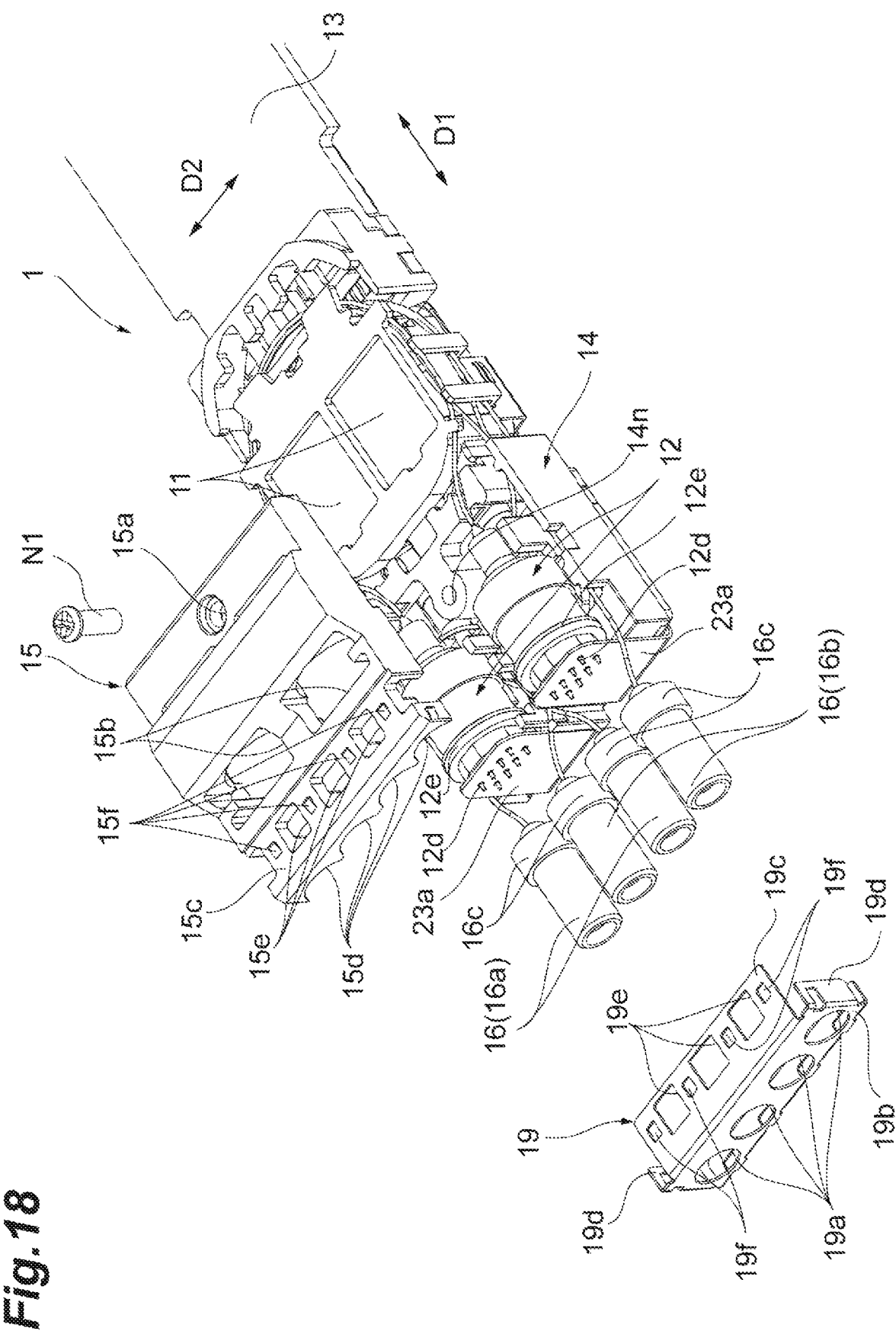
FIG. 18 is a perspective view showing the state before the second tray is joined to the first tray in FIG. 17.
Figure 19:
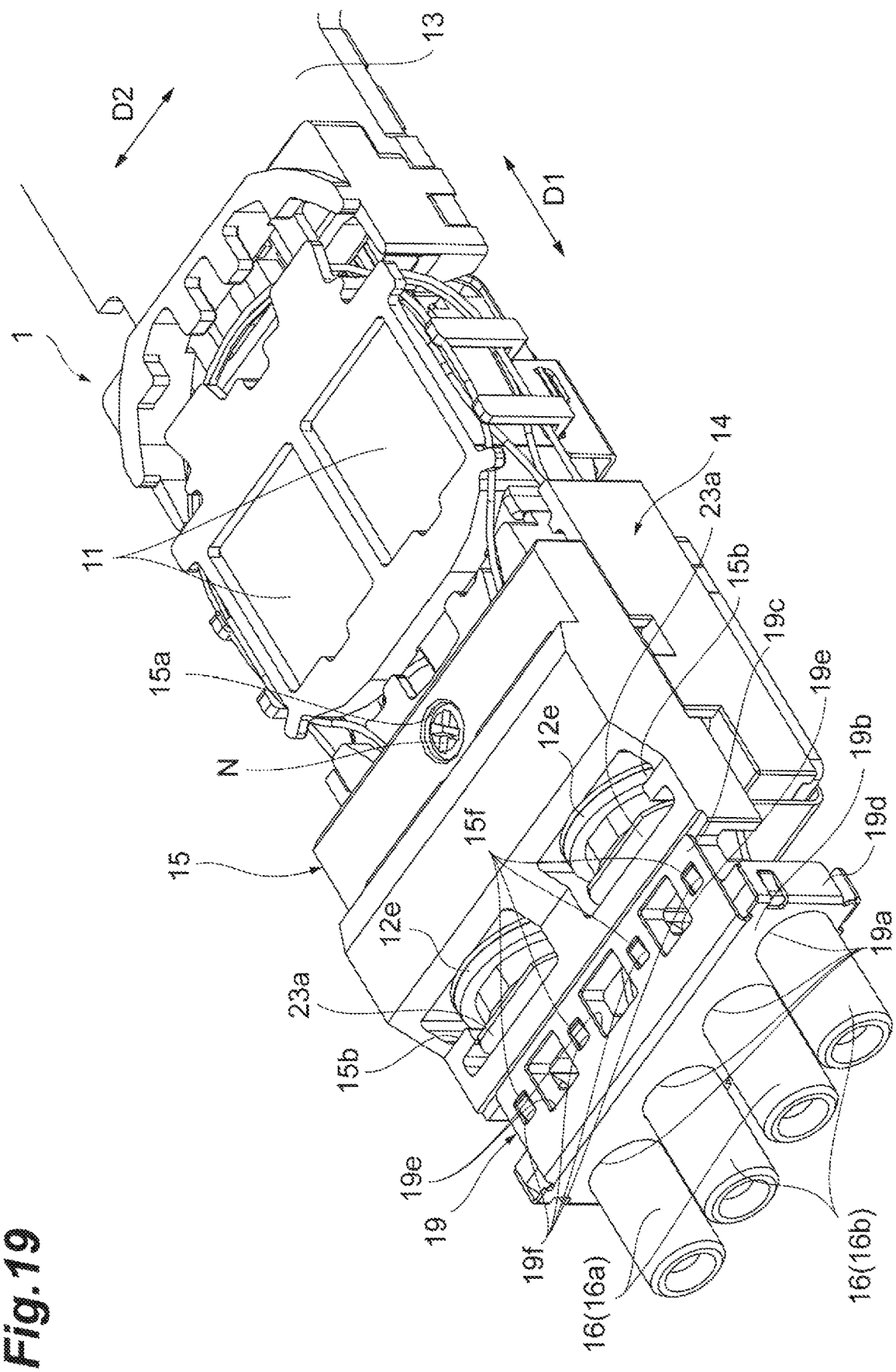
FIG. 19 is a perspective view showing an intermediate assembly obtained by joining the second tray in FIG. 18 to the first tray.

As shown in FIGS. 18 and 19, the optical transceiver 1 further includes a retaining member 19 that collectively retains the two first optical ports 16a and the two second optical ports 16b. FIG. 18 is a perspective view showing the state before the retaining member 19 is attached to the optical port 16. FIG. 19 is a perspective view showing the state in which the retaining member 19 is attached to the optical port 16. The retaining member 19 has a plurality of holes 19a into which the optical ports 16 are inserted in the one direction D1, and the plurality of holes 19a is disposed being arranged along the direction D2. The plurality of holes 19a is disposed at predetermined constant gaps such that the plurality of holes 19a can be fit into the CS connector along the direction D2. The holes 19a is a circular hole, for example. Note that the first optical port 16a and the second optical port 16b are referred using different names for convenience of explanation. However, the first optical port 16a and the second optical port 16b may have the same structure and the same appearance, or may be configured of the same material. The optical port 16 is retained by the retaining member 19, and hence the position of the optical port 16 in the direction D2 can be determined to provide predetermined gaps.

The second tray 15 is a component that covers a part of the ROSA 12 and a part of the optical port 16. The second tray 15 is in a plate shape having a through hole 15a provided on the rear, an opening 15b through which a part of the ROSA 12 is exposed, and a front part 15c that covers a part of the optical ports 16. The first tray 14 has a screw hole 14n into which a screw N inserted into the through hole 15a is screwed. The screw N is screwed into the through hole 15a and the screw hole 14n with the second tray 15 laid on the first tray 14, and hence the second tray 15 is joined to the first tray 14. By the position of the through hole 15a in the direction D1 to the second tray 15 and the position of the screw hole 14n in the direction D1 to the first tray 14, the relative position of the second tray 15 in the direction D1 to the first tray 14 is determined.

The second tray 15 has a pair of openings 15b arranged along the direction D2, and the openings 15b is rectangular, for example. From the openings 15b, a flange part 12e located on the front side of the ROSAs 12 and the ROSA-side FPC 23a joined to the lead pin 12d of the ROSA 12 are exposed. The front part 15c covers an increased diameter part 16c located on the rear side of the optical port 16. On the face of the front part 15c opposed to the optical ports 16, a plurality of concave curved surfaces 15d is formed such that the concave curved surfaces 15d follow the outer circumference of the optical port 16. Specifically, the plurality of curved surfaces 15d may be formed such that the plurality of curved surfaces 15d follows the outer circumference of the increased diameter part 16c. The plurality of curved surfaces 15d is formed such that predetermined gaps are provided in the direction D2, and hence the optical port 16 can be more firmly retained with predetermined gaps.

The retaining member 19 is fixed to the second tray 15 with the front side portion of the optical ports 16 inserted into the holes 19a described above from the rear side. The retaining member 19 has a rectangular first flat plate part 19b formed with the plurality of holes 19a, a second flat plate part 19c bent from one end of the optical transceiver 1 in the downward direction (e.g. at an angle of 90°), and a pair of third flat plate parts 19d bent on the second flat plate part 19c side from both ends in the width direction of the optical transceiver 1 (e.g. at an angle of 90°). On the front part 15c of the second tray 15, a plurality of holes 15e arranged along the direction D2 and a plurality of protruding parts 15f arranged between the plurality of holes 15e and arranged on both end sides in the direction D2. The second flat plate part 19c has a plurality of first holes 19e arranged along the direction D2 arranged and a plurality of second holes 19f arranged between the plurality of first holes 19e and arranged on both end sides in the direction D2. In the retaining member 19, the second flat plate part 19c is laid on the front part 15c with the optical ports 16 that are inserted into the holes 19a retained. By fitting the protruding parts 15f into the second holes 19f, the retaining member 19 is joined to the second tray 15. At this time, the first hole 19e overlap the holes 15e, and the third flat plate parts 19d are opposed to both end sides of the front part 15c in the direction D2. By fitting the protruding part 15f into the second hole 19f, the position of the retaining member 19 in the direction D1 to the second tray 15 is determined. As described above, since the relative position of the second tray 15 in the direction D1 to the first tray 14 is determined, the relative position of the retaining member 19 in the direction D1 to the first tray 14 is determined as well. The diameter of the increased diameter part 16c of the optical port 16 is greater than the diameter of the hole 19a of the retaining member 19, and this restricts the movement of the optical port 16 to the front side of the first flat plate part 19b. Thus, the relative position of the optical port 16 in the direction D2 to the first tray 14 is determined.

Figure 20:
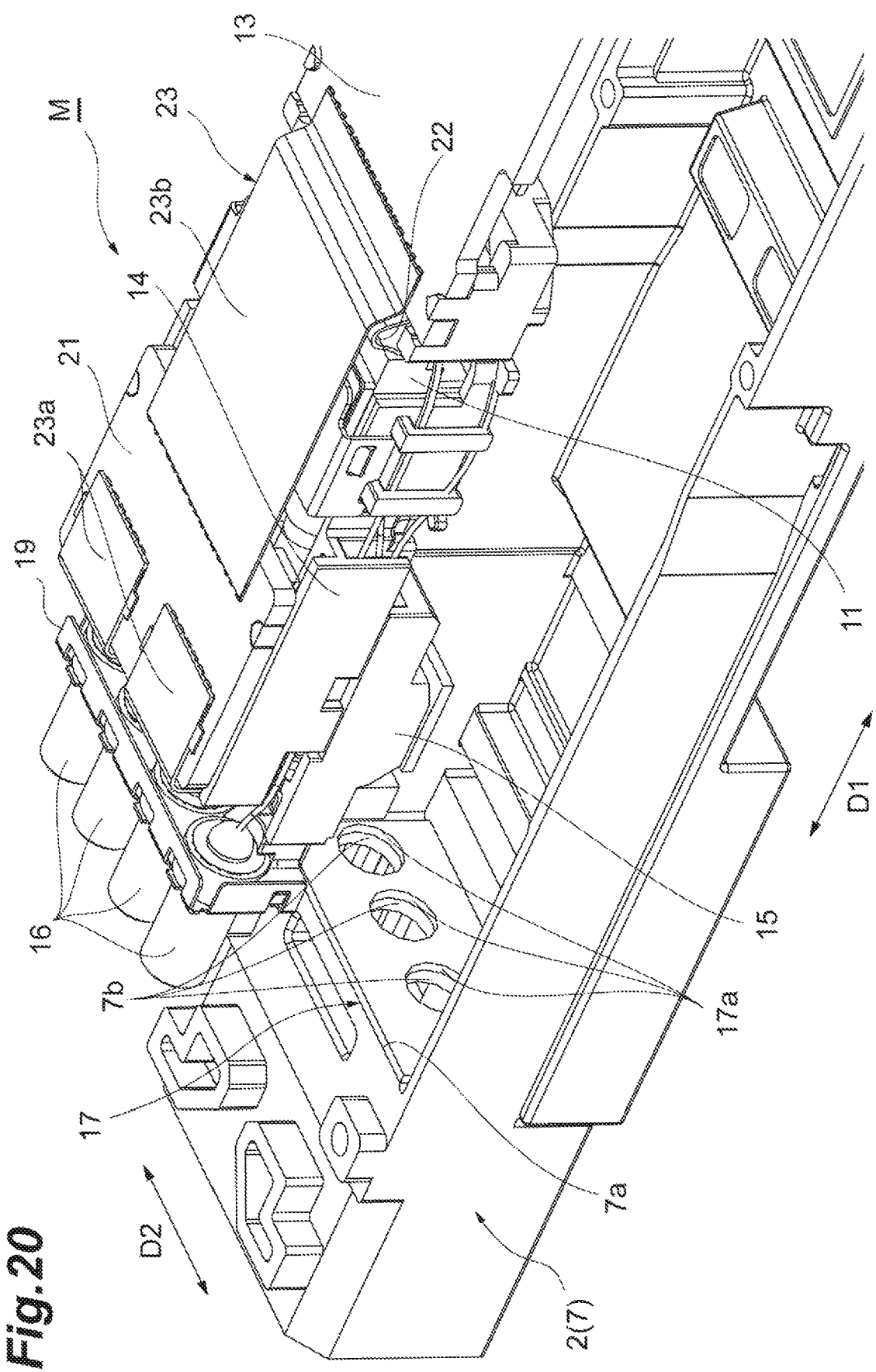
FIG. 20 is a perspective view showing the state before the intermediate assembly in FIG. 19 is attached to the housing together with the rubber sheet.
Figure 21:
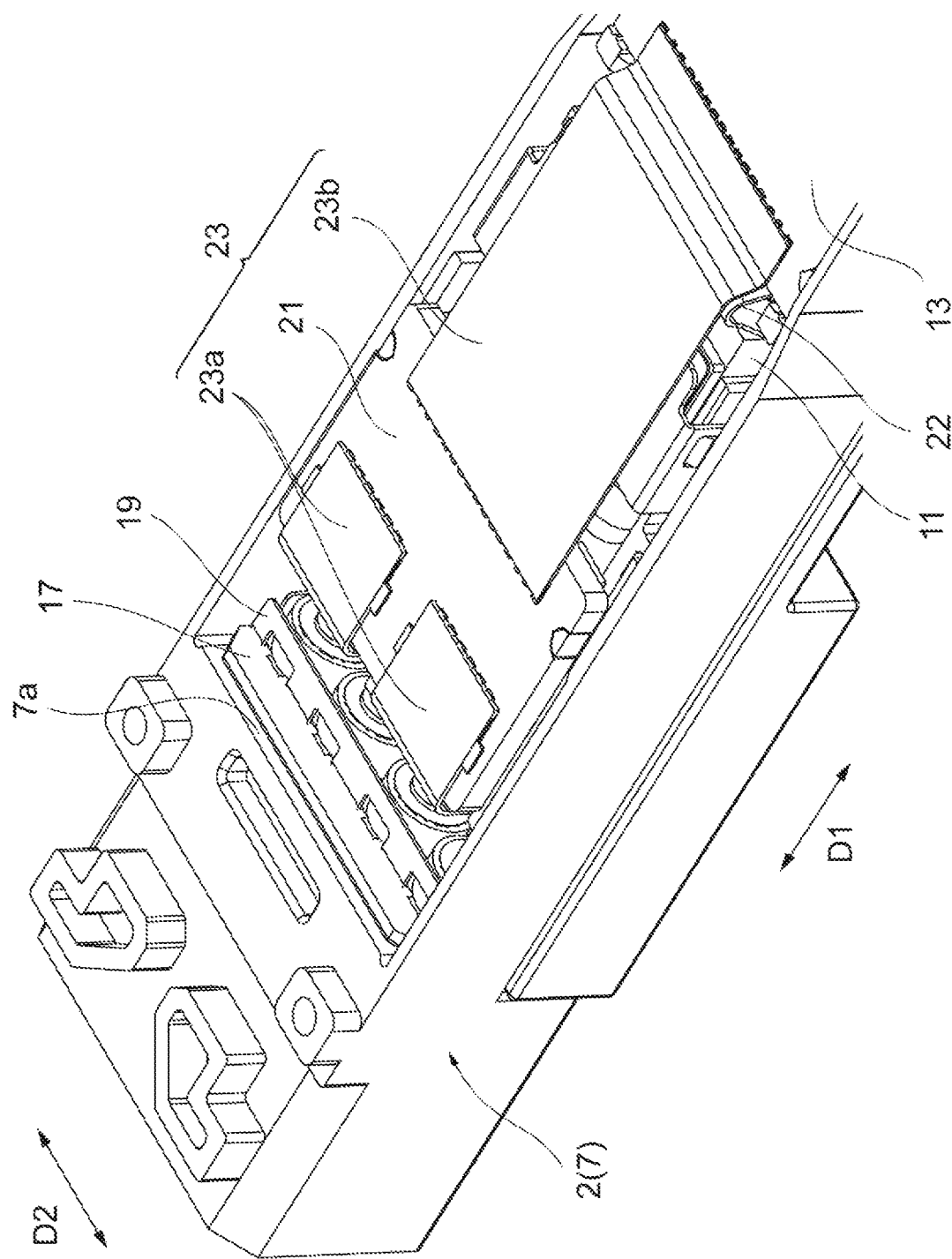
FIG. 21 is a perspective view showing the state in which the intermediate assembly in FIG. 20 is attached to the housing together with the rubber sheet.

FIG. 20 is a perspective view showing the state before an intermediate assembly M configured of the optical port 16, the retaining member 19, the second tray 15, the first tray 14, the relay board 21, the second FPC 23, the TOSA 11, and the ROSA 12 described above in an assembly is mounted in the inside of the housing 2 (the upper housing 7). FIG. 21 is a perspective view showing the state after the intermediate assembly M is mounted in the inside of the housing 2. As shown in FIGS. 20 and 21, the rubber sheet 17 is in a plate shape, and is conductive rubber having electric conductivity, for example. The rubber sheet 17 has the hole parts 17a into which the optical ports 16 are inserted, and a plurality of hole parts 17a is disposed being arranged at predetermined gaps along the direction D2. On an inner surface 7a opposed to the rear side of the housing 2, holes 7b into which the optical ports 16 are inserted are formed at predetermined gaps, and a plurality of holes 7b is disposed being arranged along the direction D2. The rubber sheet 17 is disposed on the inner surface 7a of the housing 2 such that the positions of the hole parts 17a are matched with the positions of the holes 7b. The optical ports 16 are inserted into the hole parts 17a and the holes 7b from the rear side in this state, and hence the intermediate assembly M is housed in the inside of the housing 2.

Figure 22:
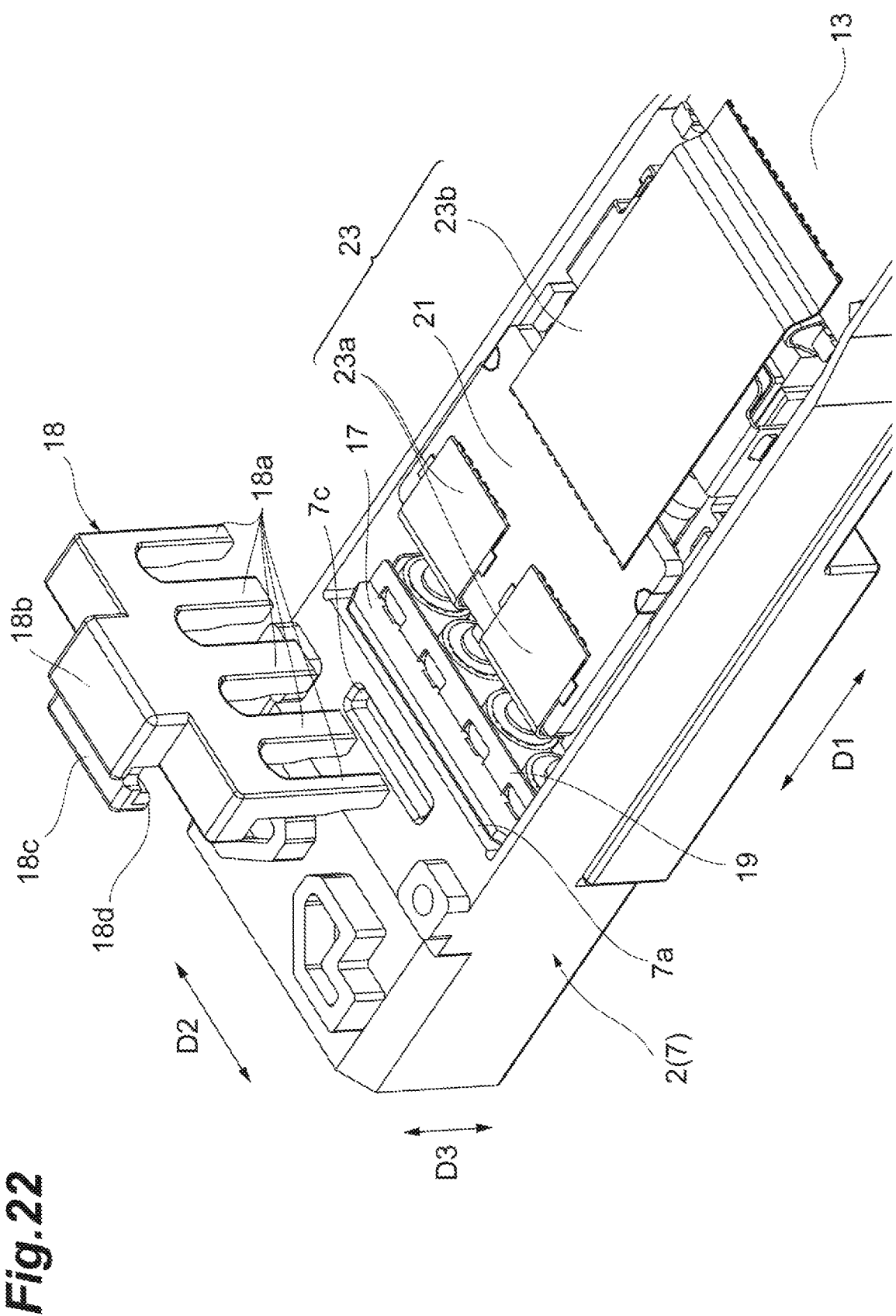
FIG. 22 is a perspective view showing the state before the retainer plate is attached to the intermediate assembly and the rubber sheet in FIG. 21.
Figure 23:
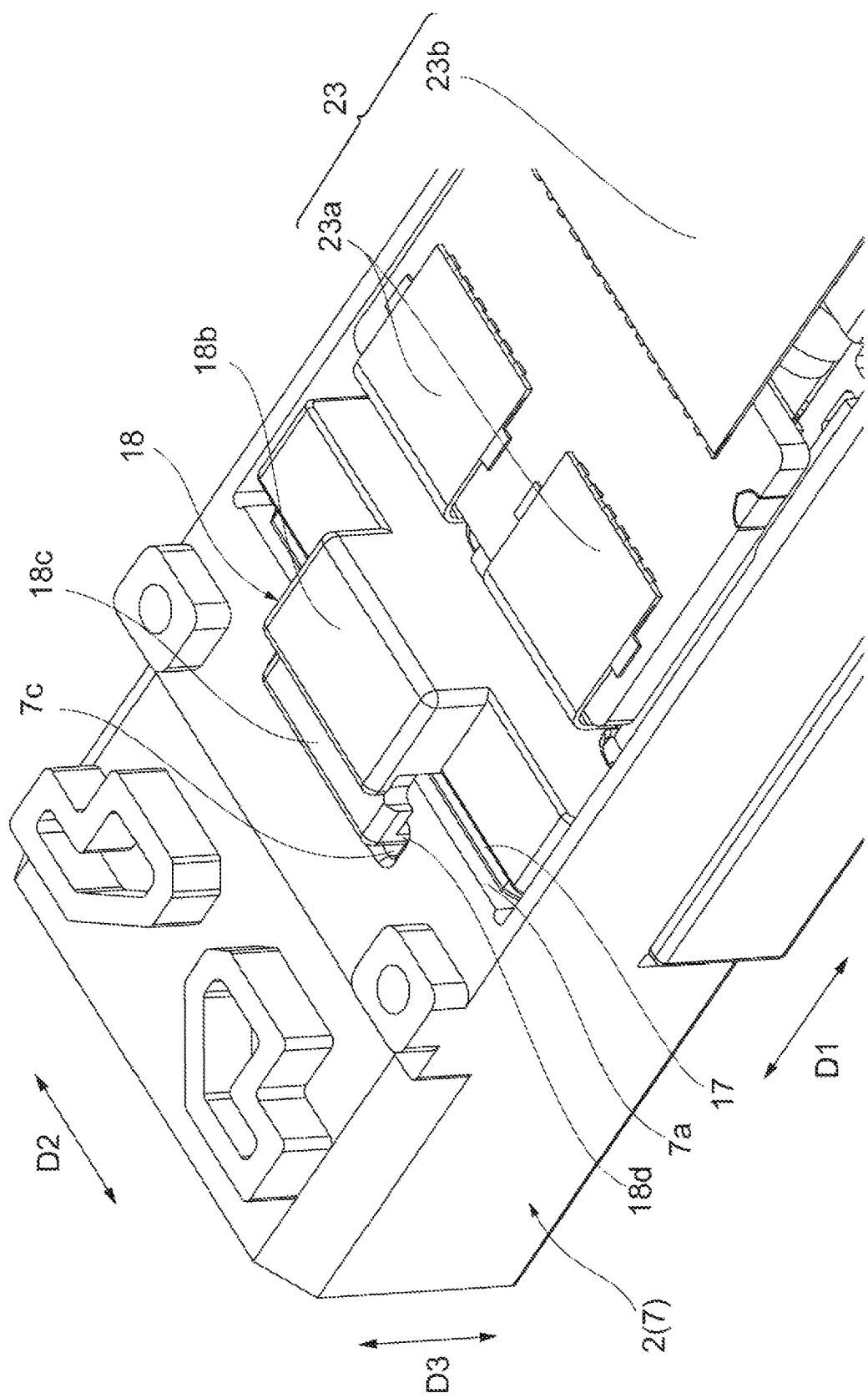
FIG. 23 is a plan view showing the state in which the retainer plate in FIG. 22 is attached to the intermediate assembly and the rubber sheet.
Figure 24:
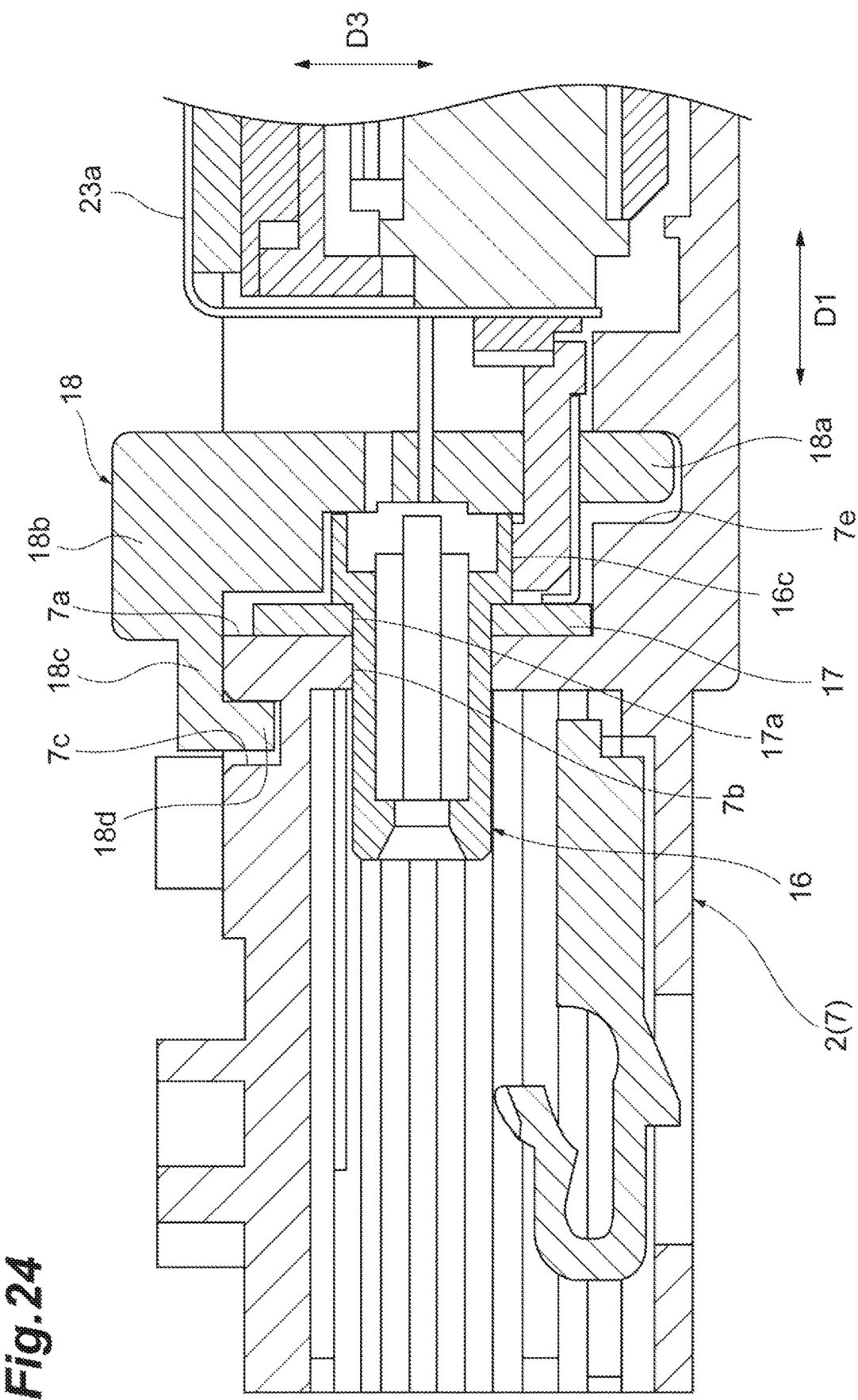
FIG. 24 is a longitudinal sectional view showing the retainer plate, the intermediate assembly, and the rubber sheet in FIG. 23.

FIG. 22 is a perspective view showing the state before the retainer plate 18 is disposed in the inside of the housing 2. FIG. 23 is a perspective view showing the state after the retainer plate 18 is disposed in the inside of the housing 2. FIG. 24 is a longitudinal sectional view showing the state after the retainer plate 18 is disposed in the inside of the housing 2. As shown in FIGS. 22 to 24, the retainer plate 18 has a plurality of first protruding parts 18a protruding in the same direction and a protruding part 18b protruding in a rectangular shape on the opposite side of the first protruding part 18a. The retainer plate 18 further has a second protruding part 18c protruding in the direction apart from the first protruding part 18a at one end of the protruding part 18b in the width direction, and a third protruding part 18d protruding in the same direction as the first protruding part 18a from the end part of the second protruding part 18c on the opposite side of the protruding part 18b.

The first protruding part 18a is inserted into the inner surface 7e of the upper housing 7. In front of the inner surface 7a of the housing 2, a hole 7c recessed in the direction D3 is provided, and the third protruding part 18d of the retainer plate 18 is fit into the hole 7c. In the retainer plate 18, the first protruding part 18a is inserted into the inner surface 7e of the upper housing 7, and the third protruding part 18d presses the optical ports 16 and the rubber sheet 17 to the inner surface 7a of the housing 2 with the third protruding part 18d fit into the hole 7c of the housing 2. Thus, the position of the optical port 16 in the direction D1 to the housing 2 is determined. Note that the retainer plate 18 may be easily removed by pinching the protruding part 18b and pulling the retainer plate 18 upward in maintenance, for example.

Figure 25:
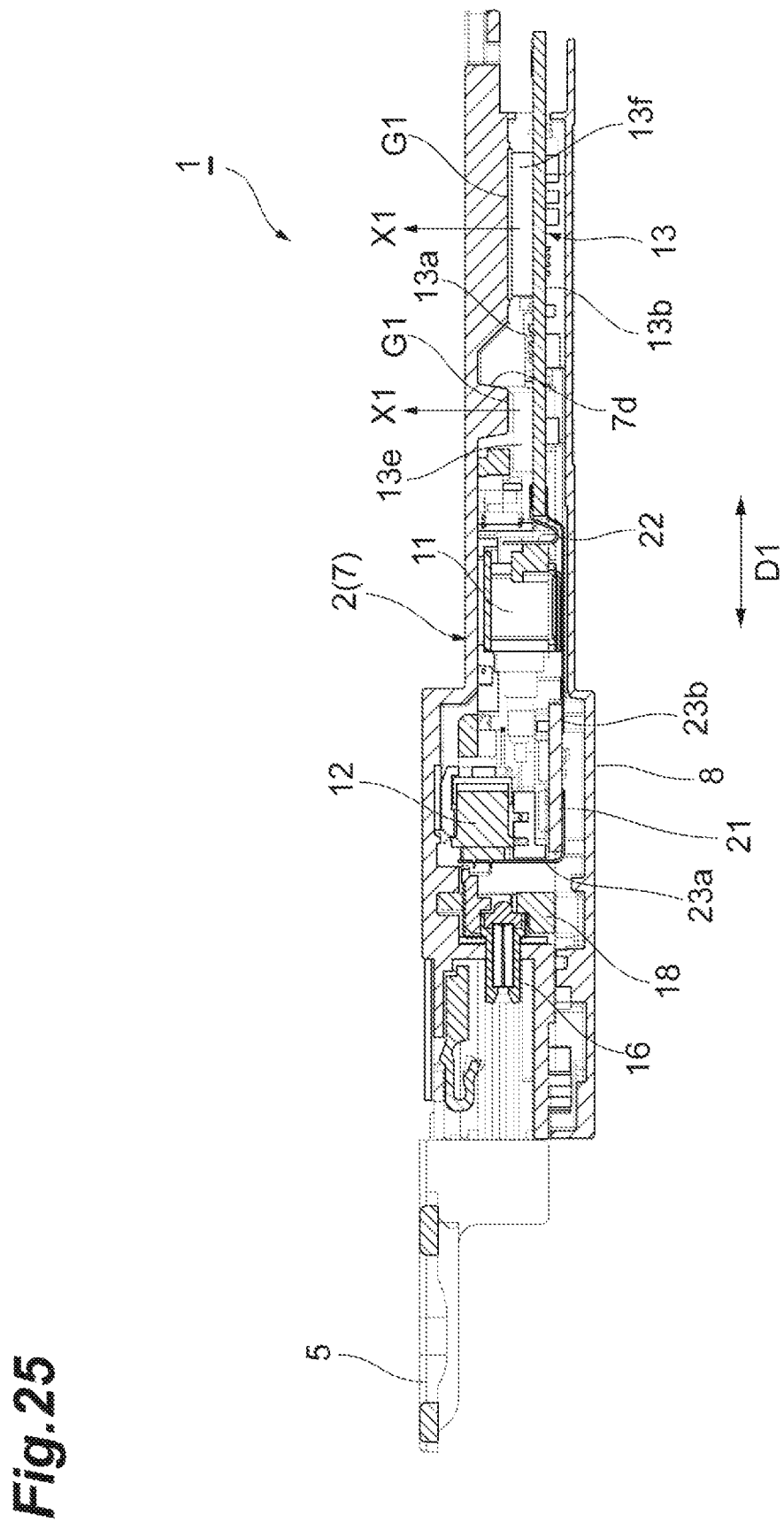
FIG. 25 is a longitudinal sectional view showing the optical transceiver in FIG. 1.

FIG. 25 is a longitudinal sectional view showing the optical transceiver 1. As shown in FIG. 25, for example, on the top surface 13a of the printed circuit board 13, a driver 13e and a digital signal processor (DSP) 13f are mounted. Between the driver 13e and the inner surface 7d of the housing 2 (the upper housing 7), and between the DSP 13f and the inner surface 7d, heat dissipation gel G1 is interposed. The heat dissipation gel G1 is interposed between the circuit elements on the printed circuit board 13 and the inner surface 7d of the upper housing 7 in this manner, a heat dissipation passage X1 for the circuit elements is formed to the outside of the optical transceiver 1. The driver 13e is an IC that generates drive signals for driving the TOSA 11, for example. The DSP 13f is an IC that performs signal processing of the electric signals received from the host system through the electric plug 6, for example. The DSP 13f may be a clock data recovery (CDR) that shapes the waveform of electric signals, for example, or may be a signal processing IC that generates or identifies PAM4 signals.

Figure 26:
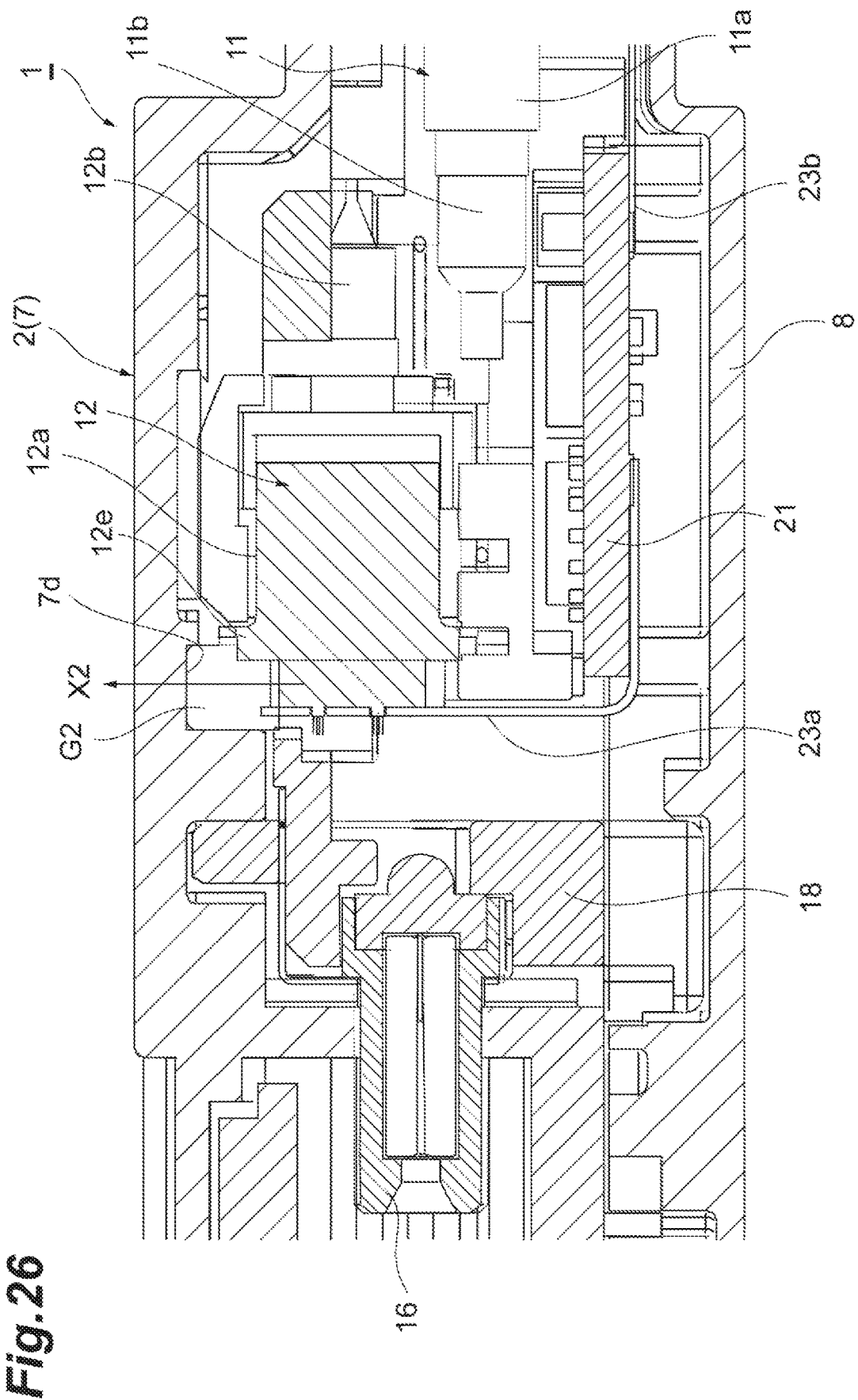
FIG. 26 is a longitudinal sectional view showing the structure of the ROSA of the optical transceiver in FIG. 25 and components around the ROSA.
Figure 27:
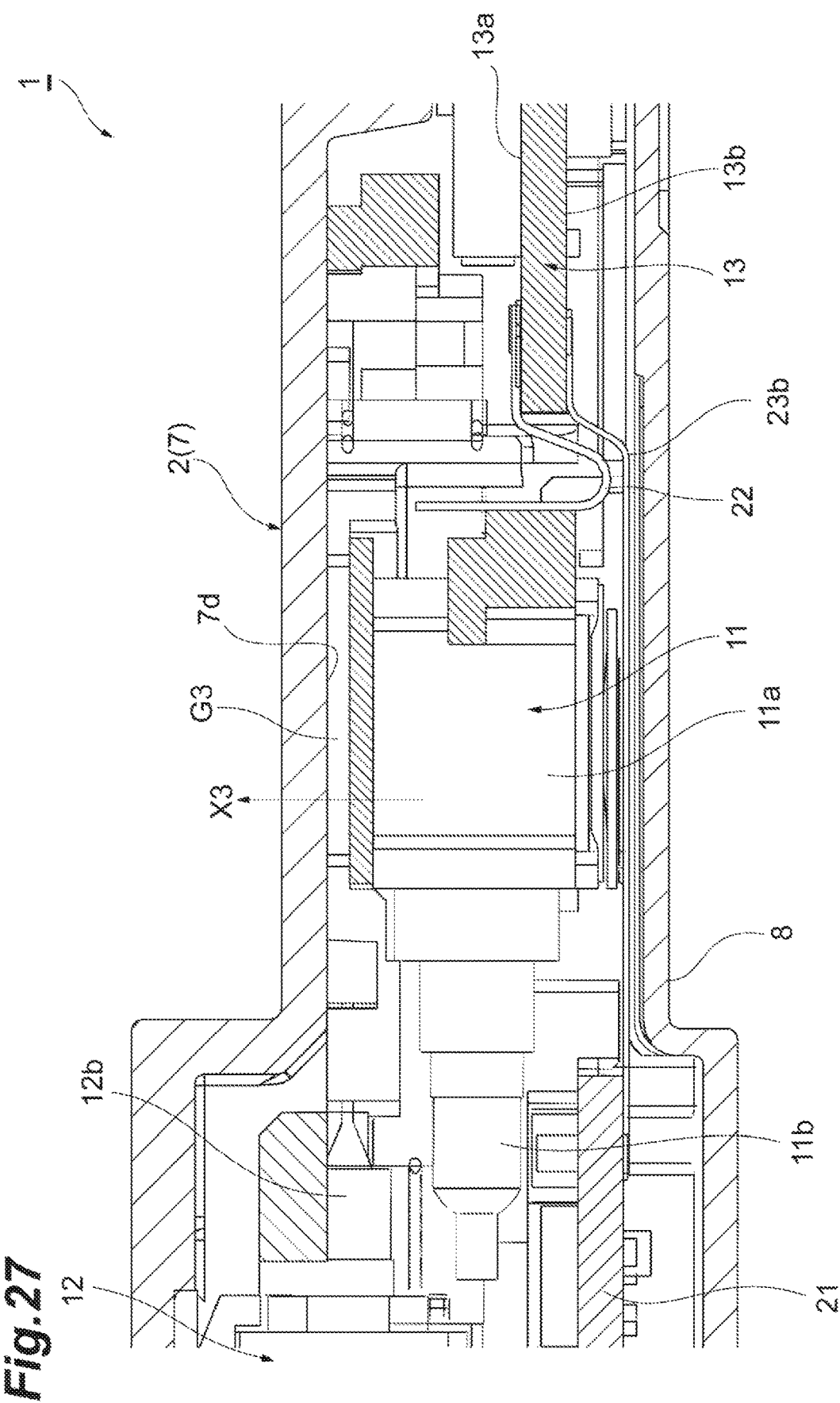
FIG. 27 is a longitudinal sectional view showing the TOSA of the optical transceiver in FIG. 25 and components around the TOSA.

FIG. 26 is a longitudinal sectional view of an enlarged ROSA 12 of the optical transceiver 1 in FIG. 25. FIG. 27 is a longitudinal sectional view of an enlarged TOSA 11 of the optical transceiver 1 in FIG. 25. As shown in FIG. 26, between the ROSA 12 and the inner surface 7d of the housing 2, heat dissipation gel G2 is interposed. The heat dissipation gel G2 is packed between the front side of the flange part 12e of the ROSA 12, the top end of the ROSA-side FPC 23a, and the inner surface 7d. The heat dissipation gel G2 reserves a heat dissipation passage X2 of the ROSA 12 to the outside of optical transceiver 1. As shown in FIG. 27, between the TOSA 11 and the inner surface 7d of the housing 2, heat dissipation gel G3 is interposed. Since the heat dissipation gel G3 is packed between the package 11a of the TOSA 11 and the inner surface 7d of the housing 2, a heat dissipation passage X3 of the TOSA 11 to the outside of the optical transceiver 1 is reserved. Typically, the power consumption of the ROSA 12 is smaller than the power consumption of the TOSA 11, and Joule heat generated by the ROSA 12 is smaller than Joule heat generated by the TOSA 11. Therefore, the volume of the heat dissipation gel G2 may be set smaller than the volume of the heat dissipation gel G3. Note that in order to make the thermal resistance of the heat dissipation passage X3 smaller than the thermal resistance of the heat dissipation passage X2, the thickness of the heat dissipation gel G3 in the direction D2 is preferably made smaller than the thickness of the heat dissipation gel G2 in the direction D2.

Next, the operation and effect obtained from the optical transceiver 1 will be described in detail. The optical transceiver 1 includes the two TOSAs 11 and the two ROSAs 12. Therefore, the transmission speed can be made high speed, compared with an optical transceiver including one TOSA and one ROSA, and higher functionality can be achieved. The optical transceiver 1 is pluggable in the one direction D1 to the cage of the communication apparatus. In the optical transceiver 1, the two first optical ports 16a and the two second optical ports 16b are arrayed along the direction D2 crossing the one direction D1. The two TOSAs 11 are arrayed along the direction D2 crossing the one direction D1, and the two ROSAs 12 are arrayed along the direction D2 crossing the one direction D1. The optical port 16 including the two first optical ports 16a and the two second optical ports 16b, the two ROSAs 12, the two TOSAs 11, and the printed circuit board 13 are arranged along the one direction D1 in this order and disposed such that these components come close to the host system. Therefore, the two first optical ports 16a and the two second optical ports 16b, the two ROSAs 12, and the two TOSAs 11, arranged in the direction D2 that is the width direction of the optical transceiver 1, and the printed circuit board 13 are arrayed in this order so as to be arranged along the one direction D1 that is the longitudinal direction of the optical transceiver 1, and hence the components having the appearance shape defined by the standards can be efficiently housed in the inside of the housing 2. Therefore, the packaging density of the components can be enhanced, and a reduction in the size of the optical transceiver 1 can be achieved.

The optical transceiver 1 includes the relay board 21 interposed between the two ROSAs 12 and the printed circuit board 13. The two ROSAs 12 are connected to the printed circuit board 13 through the relay board 21. Therefore, the relay board 21 is interposed between the ROSA 12 and the printed circuit board 13, and hence electric signals from the ROSA 12 can be amplified at the relay board 21. Therefore, even though the distance between the ROSA 12 and the printed circuit board 13 is long, the electric signals of the ROSA 12 can be reliably transmitted by the relay board 21.

The two TOSAs 11 each have the first sleeve 11b protruding on the optical port 16 side, the two ROSAs 12 each have the second sleeve 12b protruding on the printed circuit board 13 side, and the height H2 of the second sleeve 12b to the printed circuit board 13 is set greater than the height H1 of the first sleeve 11b to the printed circuit board 13. That is, the height position of the first sleeve 11b of the TOSA 11 protruding on the ROSA 12 side and the height position of the second sleeve 12b of the ROSA 12 protruding on the TOSA 11 side to the printed circuit board 13 are different from each other. Since the height positions of the first sleeve 11b and the second sleeve 12b are different from each other as described above, the TOSA 11 and the ROSA 12 can be disposed such that a part of the TOSA 11 overlaps a part of the ROSA 12 when viewed from the direction D3 that is the height direction of the optical transceiver 1. As a result, the lengths of the TOSA 11 and the ROSA 12 in the one direction D1 can be suppressed. Therefore, the length of the optical transceiver 1 in the one direction D1 can be suppressed, and hence the effect of a reduction in the size of the optical transceiver 1 can be made noticeable.

The second FPC 23 includes the ROSA-side FPC 23a that connects the two ROSAs 12 to the relay board 21, and the printed circuit board-side FPC 23b that connects the relay board 21 to the printed circuit board 13. Therefore, the ROSA 12 and the relay board 21 can be connected to each other by the ROSA-side FPC 23a, and the relay board 21 and the printed circuit board 13 can be connected to each other by the printed circuit board-side FPC 23b.

The optical transceiver 1 includes the retaining member 19 that retains the two first optical ports 16a and the two second optical ports 16b with the two first optical ports 16a and the two second optical ports 16b alternately disposed in the direction D2, and the rubber sheet 17 having the hole parts 17a into which the two first optical ports 16a and the two second optical ports 16b retained on the retaining member 19 are passed. The optical transceiver 1 further includes the retainer plate 18 that presses the two first optical ports 16a and the two second optical ports 16b passed into the hole parts 17a against the rubber sheet 17. The two first optical ports 16a and the two second optical ports 16b can be collectively retained by the retaining member 19. The two first optical ports 16a and the two second optical ports 16b are pressed against the rubber sheet 17 by the retainer plate 18. Therefore, the first optical ports 16a and the second optical ports 16b can be retained with the first optical ports 16a and the second optical ports 16b pressed against the rubber sheet 17. Thus, the position of the optical port 16 in the direction D1 can be accurately determined to the housing 2.

As described above, the embodiment of the optical transceiver according to the present disclosure is described. However, the present invention is not limited to the foregoing embodiment. That is, a person skilled in the art easily recognizes that various modifications and alterations are possible within the scope of the gist of the present invention described in claims. For example, the shapes, sizes, materials, numbers, and disposition forms of the components of the optical transceiver can be appropriately changed.

For example, in the foregoing embodiment, the optical transceiver 1 having the pull-tab 5 extending from both sides of the left and right of the housing 2 in front is described. However, for example, instead of the pull-tab, a bail rotatably supported on the housing may be included. Even an optical transceiver including the bail can obtain similar to the foregoing effect. As described above, the configurations of the components of the optical transceiver can be appropriately changed. In the foregoing embodiment, the optical transceiver 1 in compliance with the QSFP standards is described. However, the optical transceiver according to the present invention may be an optical transceiver in compliance with standards, the SFP standards, for example, the other than the QSFP standards.

What is claimed is:

1. An optical transceiver insertable to an apparatus in a first direction, the optical transceiver comprising:
an optical port including first paired ports and second paired ports, the first paired ports and the second paired ports being arranged in line in a second direction perpendicular to the first direction;

paired transmitter optical sub-assemblies (TOSAs) each performing an electrical-to-optical signal conversion, one of the paired TOSAs being optically connected to one of the first paired ports through a first fiber, another of the paired TOSAs being optically connected to one of the second paired ports through a second fiber, the paired TOSAs being arranged to each other in line in the second direction;

paired receiver optical sub-assemblies (ROSAs) each performing an optical-to-electrical signal conversion, one of the paired ROSAs being optically connected to another of the first paired ports through a third fiber, another of the paired ROSAs being optically connected to another of the second paired ports through a fourth fiber, the paired ROSAs being arranged to each other in line in the second direction;

a printed circuit board (PCB) including an electrical circuit electrically connected to the paired TOSAs and the paired ROSAs; and a housing configured to house the optical port, the paired ROSAs, the paired TOSAs, and the PCB, so that the paired ROSAs are arranged between the optical port and the PCB in the first direction and the paired TOSAs are arranged between the paired ROSAs and the PCB in the first direction.

2. An optical transceiver according to claim 1, further comprising a relay board electrically connected to the paired ROSAs and the PCB.

3. An optical transceiver according to claim 1,
wherein the first fiber extends toward the optical port from a first sleeve of the one of the paired TOSAs in the first direction,
wherein the third fiber extends toward the PCB from a second sleeve of the one of the paired TOSAs in the first direction, and
wherein the second sleeve has a height from the PCB larger than a height of the first sleeve from the PCB.

4. An optical transceiver according to claim 2, further comprising:
a first flexible printed circuit (FPC) electrically connecting the paired TOSAs and the PCB;
a second FPC including a first sub FPC and a second sub FPC, the first sub FPC electrically connecting the paired ROSAs to the relay board, the second sub FPC electrically connecting the relay board to the PCB.

5. An optical transceiver according to claim 1, further comprising:
a holding member holding the one of the first paired ports, the one of the second paired ports, the another of the first paired ports, and the another of the second paired ports in this order in the second direction;
an elastic sheet having holes in which the first pared ports and the second paired ports fit respectively; and
a retainer plate pressing the first paired ports and the second paired ports against the elastic sheet.

* * * * *